US008577793B1

(12) United States Patent (10) Patent No.: US 8,577,793 B1
Hecht et al. (45) Date of Patent: Nov. 5, 2013

(54) MULTI-VARIABLE, MULTI-PARTY AUCTION AND PROCESS TO PROP-UP UNDERWATER MORTGAGES, AND STABILIZE/RESTORE MARKET VALUES

(76) Inventors: Ira R. Hecht, Plainview, NY (US); Steven D. Kravitz, New York, NY (US)

( * ) Notice: Subject to any disclaimer, the term of this patent is extended or adjusted under 35 U.S.C. 154(b) by 121 days.

(21) Appl. No.: 13/135,051

(22) Filed: Jun. 23, 2011

Related U.S. Application Data

(60) Provisional application No. 61/398,262, filed on Jun. 23, 2010, provisional application No. 61/404,654, filed on Oct. 7, 2010, provisional application No. 61/455,396, filed on Oct. 19, 2010, provisional application No. 61/462,361, filed on Jan. 31, 2011.

(51) Int. Cl.
*G06Q 20/00* (2012.01)
*G06Q 40/00* (2012.01)
*G06Q 20/10* (2012.01)

(52) U.S. Cl.
CPC .............. *G06Q 40/00* (2013.01); *G06Q 20/102* (2013.01)
USPC ................................. 705/38; 705/40; 705/35

(58) Field of Classification Search
CPC ........ G06Q 40/02; G06Q 40/00; G06Q 20/12
USPC ............................................... 705/38, 35, 40
See application file for complete search history.

(56) References Cited

U.S. PATENT DOCUMENTS

| 7,818,254 | B1 * | 10/2010 | Ma .................................. | 705/50 |
| 2003/0036996 | A1 * | 2/2003 | Lazerson ........................ | 705/38 |
| 2006/0271458 | A1 * | 11/2006 | Arnold et al. ................... | 705/35 |
| 2009/0024515 | A1 * | 1/2009 | Collett et al. ................... | 705/37 |
| 2009/0076926 | A1 * | 3/2009 | Zinberg et al. ................. | 705/26 |

OTHER PUBLICATIONS

Harp 2.0 Principal Reduction Assitance Component by Arizona Department of Housing; 2 pages ; 2007.*
Countrywide Financial Corporation by Countrywide; 8 pages; 2005.*
RD An No. 4238 (1980-D) "Single Family Housing Guaranteed Loan Program" by Davis—Feb. 2, 2007.*
CRE Financial Advisors: Managing risk in today's volatile and rapidly changing commercial real estate and credit markets by CRE Financial Advisors; 3 pages; Feb. 8, 2010.*
Florida Foreclosure Law Basics—What you Need to Know by Floriday Morgage Blogger; 5 pages; Mar. 1, 2009.*
Our Programs by North Carolina Housing Finance Agency; 5 pages Mar. 15, 2008.*
www.foreclosure-help-center.com/2MP-HAMP.html; 2MP HAMP: second Lien Modification; 3 pages; Apr. 10, 2010.*

* cited by examiner

*Primary Examiner* — Ella Colbert
*Assistant Examiner* — Mary Gregg
(74) *Attorney, Agent, or Firm* — Thomas A. O'Rourke; Bodner & O'Rourke, LLP

(57) ABSTRACT

Online multi-variable/multi-party auctions coordinate homeowners, mortgage holders, and investors to refinance homes with underwater mortgages, being initiated by homeowner/mortgage holder registration within the website. Registration triggers email invitations with access to personalized bidding platforms. Auctioning comprises bidding for a new total loan amount equaling/exceeding current fair market values, and/or matching interest rate bids by investors, who may risk share therein, with homeowner monthly payment bids. Auction completion requires homeowner, lien holder(s), and investor(s) acceptance, resulting in mutual rescission of original loan agreement(s). Electronic closings create Time-Out Mortgages, which are recorded, and Home Certificates—a hybrid security being a combination promissory note (with additional benefits) and agreement for sharing a "Deferred Recapture Amount," being a difference between the new principal loan amount and prior total home lien amounts. Sharing is tailored at auction according to one of several schemes incentivizing agreement, which drive up housing prices while reducing risk of foreclosure.

5 Claims, 16 Drawing Sheets

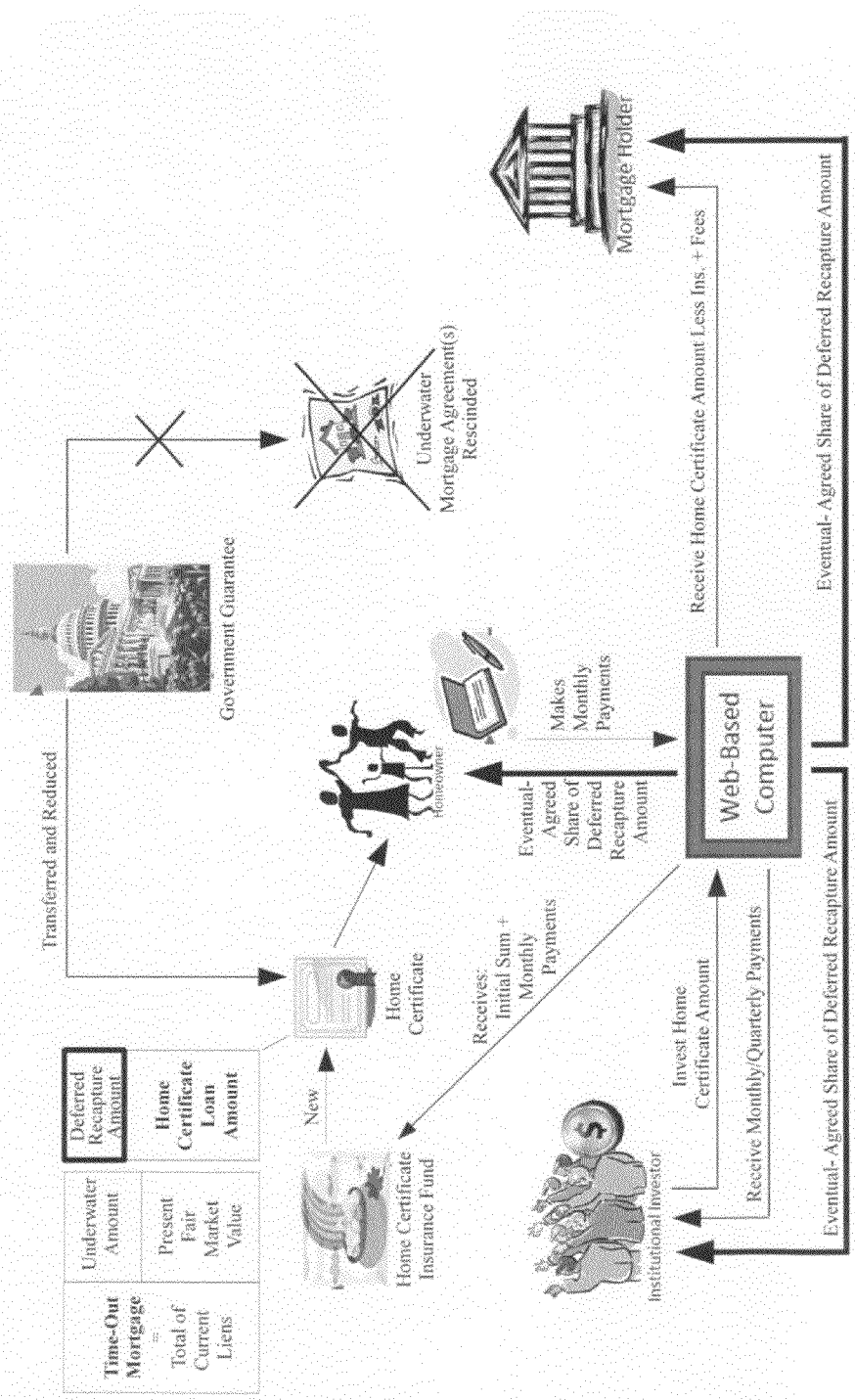
FIG. 3 Relationships Resulting from Auction

Scenarios for Sharing Deferred Recapture Amount (Realized as Appreciation)

Bid For:
Fixed Share Only
(E.g.: 25%, 25%, 50%)

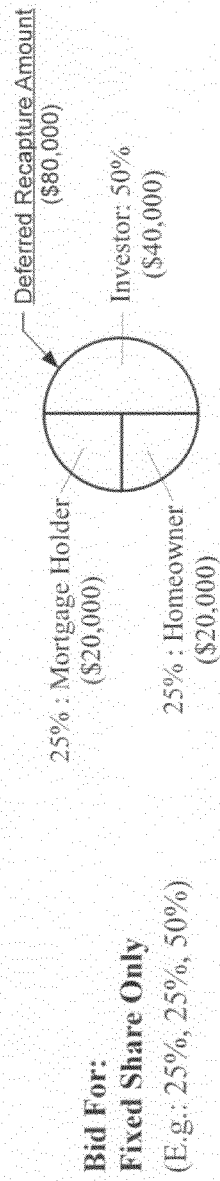

- Deferred Recapture Amount ($80,000)
- 25% : Mortgage Holder ($20,000)
- Investor: 50% ($40,000)
- 25% : Homeowner ($20,000)

Bid For:
Later-Varying Share Amount Scenario

Scenario #1
Homeowner Double Bonus Method

As the Homeowner's Monthly Payment Increases,
the Payoff Offer Amount Increases by a GREATER PERCENTAGE.

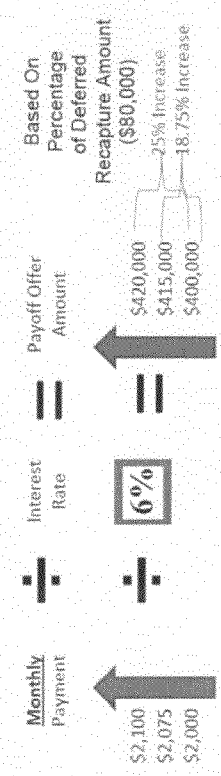

| Monthly Payment | ÷ | Interest Rate | = | Payoff Offer Amount | = | Based On Percentage of Deferred Recapture Amount ($80,000) |

- $2,100
- $2,075
- $2,000

- 6%

- $420,000
- $415,000 — 25% Increase
- $400,000 — 18.75% Increase

The homeowner is incentivized to increase their monthly payment by being rewarded two times the amount that the increased monthly payment increases the Payoff Offer Amount in comparison to the Deferred Recapture Amount.

If the homeowner increases their monthly payment by $75 over the base monthly payment (which is the amount that when multiplied by 12 and divided by the interest rate bid is equal to the fair market value of the home), Their payment caused a decrease of the deferred Recapture Amount by 18.75%.

Therefore, the Homeowner earns 37.5% (2 X 18.75% = $30,000) of the recovery of the Deferred Recapture Amount ($80,000).

The remaining portion of the Deferred Recapture Amount not earned by the Homeowner is then divided equally by the Mortgage Holder ($25,000) and Investor ($25,000).

FIG. 6

Other Scenarios for: Later-Varying Share of Deferred Recapture Amount

Scenario #2: Buy-in Method: For each dollar of monthly payment that results in the Home Certificate Amount exceeding the fair market value of the home, the Homeowner keeps that same percentage (the percentage that Home Certificate Amount exceeds the fair market value of the home) of the Deferred Recapture Amount upon sale.

| Buy-In Return Method | | | | |
|---|---|---|---|---|
| Purchase Amout | $500,000.00 | | | |
| Original Loan Amount | $500,000.00 | | | |
| Current Total Lien Amount | $450,000.00 | | | |
| Current Fair Market Value (Base Principal Amount) | $400,000.00 | | | |
| Base Monthly Payment Amount (at current blended rate) | $1,250.00 | | | |
| Homeowner Monthly Payment Bid Needed to Equal FMV at current blended interest rate | $1,250.00 | $1,275.00 | $1,300.00 | $1,325.00 | $1,350.00 |
| Interest Rate Bid | 2.5000% | | | |
| Insurance & Fees | 1.2500% | | | |
| Blended Rate | 3.7500% | 3.7500% | 3.7500% | 3.7500% | 3.7500% |
| Calculated Principal Amount based upon Current Blended Interest Rate | $400,000.00 | $408,000.00 | $416,000.00 | $424,000.00 | $432,000.00 |
| Monthly Payment Amount Above Base Monthly Payment Amount | | $25.00 | $50.00 | $75.00 | $100.00 |
| Calculated Principal Above FMV | | $8,000.00 | $16,000.00 | $24,000.00 | $32,000.00 |
| Current Total Lien Amount Less FMV | | $50,000.00 | $50,000.00 | $50,000.00 | $50,000.00 |
| Deferred Recapture Amount | | $42,000.00 | $34,000.00 | $26,000.00 | $18,000.00 |
| Earned Percentage | | 16.0000% | 32.0000% | 48.0000% | 64.0000% |
| Deferred Recapture Amount Allocated to Homeowner | | $6,720.00 | $10,880.00 | $12,480.00 | $11,520.00 |
| Deferred Recapture Amount to be Allocated to Other Participants | | $35,280.00 | $23,120.00 | $13,520.00 | $6,480.00 |

FIG. 7A

Other Scenarios for: Later-Varying Share of Deferred Recapture Amount

Scenario #3: Increasing Return Method: For each dollar of monthly payment that results in the Home Certificate Amount exceeding the fair market value of the home, the Homeowner keeps that same percentage (the percentage that Home Certificate Amount exceeds the fair market value of the home) plus a bonus that ever increases of the Deferred Recapture Amount upon sale.

| Increasing Return Method | | | | | |
|---|---|---|---|---|---|
| Purchase Amout | $500,000.00 | | | | |
| Original Loan Amount | $500,000.00 | | | | |
| Current Total Lien Amount | $450,000.00 | | | | |
| Current Fair Market Value (Base Principal Amount) | $400,000.00 | | | | |
| Base Monthly Payment Amount (at current blended rate) | $1,250.00 | | | | |
| Homeowner Monthly Payment Bid Needed to Equal FMV at current blended interest rate | $1,250.00 | $1,275.00 | $1,300.00 | $1,325.00 | $1,350.00 |
| Interest Rate Bid | 2.5000% | | | | |
| Insurance & Fees | 1.2500% | | | | |
| Blended Rate | 3.7500% | 3.7500% | 3.7500% | 3.7500% | 3.7500% |
| Calculated Principal Amount based upon Current Blended Interest Rate | $400,000.00 | $408,000.00 | $416,000.00 | $424,000.00 | $432,000.00 |
| Monthly Payment Amount Above Base Monthly Payment Amount | | $25.00 | $50.00 | $75.00 | $100.00 |
| Calculated Principal Above FMV | | $8,000.00 | $16,000.00 | $24,000.00 | $32,000.00 |
| Current Total Lien Amount Less FMV | | $50,000.00 | $50,000.00 | $50,000.00 | $50,000.00 |
| Deferred Recapture Amount | | $42,000.00 | $34,000.00 | $26,000.00 | $18,000.00 |
| Earned Percentage | | 16.0000% | 32.0000% | 48.0000% | 64.0000% |
| Bonus Percentage (2 times additional dollars divided by 10000) | | 0.5000% | 1.0000% | 1.5000% | 2.0000% |
| NOTE: The multiplier (here being 2) may vary for each Implementation. | | | | | |
| Increasing Retrun Allocation of Deferred Recapture Amount | | 16.5000% | 33.0000% | 49.5000% | 66.0000% |
| Deferred Recapture Amount Allocated to Homeowner | | $6,930.00 | $11,220.00 | $12,870.00 | $11,880.00 |
| Deferred Recapture Amount to be Allocated to Other Participants | | $35,070.00 | $22,780.00 | $13,130.00 | $6,120.00 |

FIG. 7B

Other Scenarios for: Later-Varying Share of Deferred Recapture Amount

Scenario #4: Decreasing Return Method: For each dollar of monthly payment that results in the Home Certificate Amount exceeding the fair market value of the home, the Homeowner keeps that same percentage (the percentage that Home Certificate Amount exceeds the fair market value of the home) plus a bonus that ever decreases of the Deferred Recapture Amount upon sale.

| Decreasing Return Method | | | | | | |
|---|---|---|---|---|---|---|
| Purchase Amout | $500,000.00 | | | | | |
| Original Loan Amount | $500,000.00 | | | | | |
| Current Total Lien Amount | $450,000.00 | | | | | |
| Current Fair Market Value (Base Principal Amount) | $400,000.00 | | | | | |
| Base Monthly Payment Amount (at current blended rate) | $1,250.00 | | | | | |
| Homeowner Monthly Payment Bid Needed to Equal FMV at current blended interest rate | $1,250.00 | $1,275.00 | $1,300.00 | $1,325.00 | $1,350.00 | $1,406.25 |
| Interest Rate Bid | 2.5000% | | | | | |
| Insurance & Fees | 1.2500% | | | | | |
| Blended Rate | 3.7500% | 3.7500% | 3.7500% | 3.7500% | 3.7500% | 3.7500% |
| Calculated Principal Amount based upon Current Blended Interest Rate | $400,000.00 | $408,000.00 | $416,000.00 | $424,000.00 | $432,000.00 | $450,000.00 |
| Monthly Payment Amount Above Base Monthly Payment Amount | | $25.00 | $50.00 | $75.00 | $100.00 | $156.25 |
| Calculated Principal Above FMV | | $8,000.00 | $16,000.00 | $24,000.00 | $32,000.00 | $50,000.00 |
| Current Total Lien Amount Less FMV | | $50,000.00 | $50,000.00 | $50,000.00 | $50,000.00 | $50,000.00 |
| Deferred Recapture Amount | | $42,000.00 | $34,000.00 | $26,000.00 | $18,000.00 | $0.00 |
| Earned Percentage | | 16.0000% | 32.0000% | 48.0000% | 84.0000% | 100.0000% |
| Bonus Percentage (2 times maximum additional dollars minus actual additional dollars divided by 10000) | | 2.6250% | 2.1250% | 1.6250% | 1.1250% | 0.0000% |
| NOTE: The multiplier (here being 2) may vary for each implementation. | | | | | | |
| Increasing Return Allocation of Deferred Recapture Amount | | 18.6250% | 34.1250% | 49.6250% | 65.1250% | 100.0000% |
| Deferred Recapture Amount Allocated to Homeowner | | $7,822.50 | $11,602.50 | $12,902.50 | $11,722.50 | $0.00 |
| Deferred Recapture Amount to be Allocated to Other Participants | | $34,177.50 | $22,397.50 | $13,097.50 | $6,277.50 | $0.00 |
| Maximum Additional Dollars Calculated as ((Current Total Lien Amount multiplied by Blended Interest Rate) divided by 12) | $1,406.25 | | | | | |

FIG. 7C

MCSP

INVESTOR ENTRY

REGISTRATION NUMBER "ENTRY"

EMPLOYER IDENTIFICATION NUMBER "ENTRY"

PASSWORD "ENTRY"

MINIMUM ACCEPTABLE INTERET RATE/TERM    RATE "PULL-DOWN" TERM "PULL-DOWN"

MAXIMUM INDIVIDUAL HOME CDERTUIFICATE AMOUNT "PULL-DOWN"

MAXIMUM TOTAL OF ALL HOME CERTIFIXCATES "ENTRY"

MINIMUM DEFERRED RECAPTURE AMOUNT REQUIRED "PULL-DOWN"

FIG. 9B

MCSP
CALCULATIONS

HOMEOWNER DATA
MONTHLY PAYMENT BID
   entered by Homeowner — "DATA"
FAIR MARKET VALUE
   from appraisal online or actual — "DATA"
AMOUNT OWED
   from loan records — "DATA"

INVESTOR DATA
ACCEPTABLE INTEREST RATE AND TERM PAIRS
   entered by Investor — "DATA"
MAXIMUM INDIVIDUAL HOME CERTIFICATE AMOUNT
   entered by Investor — "DATA"
MAXIMUM TOTAL OF ALL HOME CERTIFICATES
   entered by Investor — "DATA"

CALCULATIONS (Mortgage Holder/Servicer, Guarantor or Insurer, if required)
PAY-OFF AMOUNT CALCULATED BID — "CALCULATED"

AMOUNT OWED — "DATA"

DEFERRED RECAPTURE AMOUNT
   calculated based upon implementing legislation, rules &/or regulations — "CALCULATED"
LOSS RECAPTURE AMOUNT
   allocation to Mortgage Holder — "CALCULATED"
PAY-OFF PERCENTAGE
   See if greater than minimum for default acceptace — "CALCULATED"

FIG. 9D

MULTI-VARIABLE, MULTI-PARTY AUCTION AND PROCESS TO PROP-UP UNDERWATER MORTGAGES, AND STABILIZE/RESTORE MARKET VALUES

RELATED APPLICATIONS

This application claims priority on U.S. Provisional Application Ser. No. 61/398,262, filed on Jun. 23, 2010, U.S. Provisional Application Ser. No. 61/404,654, filed on Oct. 7, 2010, U.S. Provisional Application Ser. No. 61/455,396 filed on Oct. 19, 2010, and U.S. Provisional Application Ser. No. 61/462,361, filed on Jan. 31, 2011, with the disclosures of each being incorporated herein by reference.

FIELD OF THE INVENTION

The present invention relates generally to computer-enabled financial transactions and, more specifically, to financial transactions optimized for the consumer/purchaser through open bidding responsive to transaction parameters, as those parameters are specified by primary and secondary participants (as well as optional tertiary participants) to the transactions, wherein the process is enabled and facilitated by the use of microprocessor-controlled and network-enabled devices. In a particularly preferred embodiment of the present invention, the transactions are directed toward creation of investment products designed to be used for the financing and refinancing of mortgage loans.

BACKGROUND OF THE INVENTION

Regardless of the causes of the current economic malaise in which the U.S. as well as much of the rest of the world finds itself, theories and blame will abound. To the average American homeowner, the reasons or economic theories behind the current crisis are immaterial. The only question that counts now is "how am I going to be able to continue to pay my mortgage?" or, more alarmingly, "where am I and my family going to be able to live if I cannot pay my mortgage?" Despite (or perhaps because of) an unprecedented period that saw the American dream of homeownership extended further down the economic ladder to hitherto unheard of levels, the number of properties under mortgage has reached astounding levels, estimated to be as high as 80,000,000 in the United States. Most alarmingly, the proportion of those mortgages that are in distress is large and continuing to grow. By some estimates, the portion of homes with a possibility of going into foreclosure may reach as high as 25%. Both newly enfranchised homeowners, as well as long-time homeowners alike, are feeling the stress. These situations, defined as and understood to be "distressed," run the gamut from homes already in foreclosure, to homes where the owners are a payment or two behind (many with little or no reasonable chance to catch up), to homes where the payments may be up to date, but the present fair market value of the home is well below the outstanding principal balance on the mortgage, which is referred to as an "underwater mortgage." This last situation is perhaps among the most insidious, as the economic downturn in the housing market effectively robs homeowners, through no fault of their own, of the economic benefit of homeownership, and an inability to refinance using traditional mortgage products since there is no equity in the home. As politicians and government entities float proposals for bailing out the mortgage industry, it is this last component of homeowners who may become the most victimized due the very fact of their financial ability to maintain their mortgage payments. No one seems to be proposing a bailout for them.

What recent years have seen, increasingly, is that computers and the Internet are having an impact on how consumers engage in lending transactions, such as mortgages. Largely gone are the days of manually filling out paper forms, bringing them to a loan officer at the local bank, and anxiously awaiting the lender's decision on the application. For the majority with Internet access and a personal computer, their bank's Web site invariably provides links not to just account info, but also to lending services. Nor is access to this type of on-line service usually restricted solely to those with accounts at the lending institution. Undoubtedly, the banking industry has recognized that correlations between financial services such as lending, and incentives for opening and/or maintaining a deposit account at a specific institution, are quite strong. In addition, if you analyze on-line lending services and processes currently available, particularly in comparison to more general types of on-line commercial transactions, an important factor becomes increasingly apparent. That factor is the unique nature of financial transactions and, in particular, of loan transactions. This uniqueness lies, to a great extent, as already addressed, in the number of variables involved in the transaction and their complex interaction. Although there are currently on-line securities trading and on-line mortgage and loan services, their development and acceptance by consumers appears to have been evolving somewhat slower than for other types of commerce on the Internet. To the extent that sophisticated computer-based programs exist for trading securities in bulk, these are largely directed toward optimizing these rather unique transactions where prices are directly affected by the process of purchase and sale. Nothing currently exists that is designed to facilitate and optimize the process of offer and sale of securities, where specific terms of the security that is the subject of the transaction are dynamically determined through that process, all in a manner designed to optimize the outcome of the transaction for the participants.

The vast majority of on-line transactions (primarily purchases of goods) have one factor in common—the products that are the subject of these transactions are essentially fungible. In this factor lies one of the greatest advantages of the Internet. For the great majority of consumers, the specific source of goods purchased on-line is not a major factor in purchasing decisions. In contrast, financial transactions, particularly lending, involve both products and purchasers that are by no means fungible and are, in many ways, unique. In addition, both seller and purchaser must engage in some form of a mutual evaluation process (underwriting of credit-worthiness) in the course of such transactions. Due to the convenience of computer/Internet access to financial processes such as loan transactions, an individual consumer will find it much easier than in the past to get access to such transactions and, perhaps more importantly, utilize opportunities for finding transactions with terms most favorable to him or her. Once again, computers and Internet access can enable a much greater extent of comparison shopping, whether for a tie for your favorite uncle at Christmas, or a loan on your first or next home purchase.

A number of on-line loan clearing-house operations are now available on the Internet. However, virtually all of these on-line lending services suffer from the same limitations already addressed. Due in no small way to the complexity of these types of transactions, typical on-line lending services do no more than what has been done in the past when all such transactions took place on paper, and in person. Through the use of computer systems and network connectivity, the process of bringing the parties together is more efficient now, but the basic processes remain unchanged, and the form and structure of what products are available to customers remains subject to the same forces that control traditional, "non-digital" transactions.

Regardless of the hows and the whys of the current financial crisis, the present inventors have developed a computer/internet-based process and unique financial instruments that offers the potential for a real solution to the proliferation of distressed mortgage loans as well as replacing the current model for real estate finance.

SUMMARY OF THE INVENTION

The present invention is directed to a method and system for affecting positive change to the current mortgage and home foreclosure crisis. One embodiment of the current invention may involve participation and contractual agreement among relevant parties, including: a homeowner, the mortgage holder(s), one or more institutional investors or other investors, and an agency for facilitating necessary interactions. The agency may be a government agency, or may be a non-governmental organization (NGO), or other person or entity that may act as a program administrator. The method may be directed to a three-part solution: providing appropriate incentive to all the participants resulting in a unique refinancing arrangement for the home; creating a participant funded insurance program; and operating in a new and unique manner that serves to support and/or drive up the value of homes currently financed primarily by an "underwater mortgage," meaning that the current total liens against the property is greater than its presently deflated, fair market value (FMV).

Each of the parties may initially "negotiate" an agreement over the internet using software of the present invention, which may reside on the NGO or agency's server or computer, or on one belonging to another party. Initiation of the process may be by an advocate of the homeowner educating and directing the homeowner as to the availability of, and steps involved, in completing the process. The affected homeowner may utilize a personal computer and search over the internet for the program's website, and may register in the program by entering their relevant personal data, such as their Loan Number, the Bank ID Number, ABA Number, Mortgage Banker License Number, etc. Similarly, mortgage holders (or the applicable servicer on their behalf) may also independently enter the same information concerning mortgage loans that are currently in default, close to or in danger of being in default, and/or are underwater (FIG. 1). When the software recognizes that a matching Homeowner and Mortgage Holder have both registered for the program, an e-mail may be transmitted to both parties providing each with the other's contact information (phone number, address, e-mail address), and providing each with a loan modification invitation, along with particular web-site access information for the parties to interact therein on a bidding platform. (Note—in an alternate embodiment, either the homeowner or the mortgage holder may register with the necessary information, triggering the dispatch of the email invitation to both parties). Institutional investors may also be provided with an invitation and appropriate access to enter the bidding platform.

At the core of the process is recognition of the fact that foreclosure by the mortgage holder(s) to acquire a property currently valued at far less than the outstanding loan(s), while there is already a glut of properties on the market, only further devaluates all property in the city or region of a state, and is contrary to mortgage holders' interest in being paid at least the principal balance, if not the accrued interest as well. It furthermore recognizes that the present situation contravenes the interests of all the parties because in addition to potentially leaving the distressed property owner homeless, it actually encourages such homeowners with underwater mortgages to commit a strategic default and follow the advice of at least one website that is similarly titled, which is namely that "you walk away" from your home, and perhaps rent a home down the block for much less, in order to gain financial freedom and begin anew.

Currently, in the state of Arizona, roughly 50% of all mortgaged homes are underwater, while in the state of Nevada, roughly 65% of home mortgages are underwater. The problem has reached a crisis, because all relevant parties see no way to resolve the impasse and stubbornly refuse to change their position, which is nonetheless financially unsound and mutually non-beneficial. The homeowner has a largely devalued property and sees no viable option but to accept foreclosure, the mortgage holders are plagued with mortgages on properties where the owner wants to walk away, leaving no apparent option but foreclosure, and institutional investors are afraid to lend where the security is in the form of a devalued property that no one is now interested in purchasing. The system and process of the current invention actively works to resolve this problem, by offering a solution that changes the outlook and posture of each of the three critical parties, and thereby produces a new and completely unexpected result—which is namely a new alternate path that incentivizes lending and investment while making foreclosure the less desirous choice, rather than the only option. The invention does far more than any current online real estate finance provider like Lendingtree.com, or the newer peer-to-peer lending sites like Prosper, Lending Club, Zopa, and Loanio, which only passively attempt to connect lenders with borrowers in an online forum, which is the status quo that is only capable of perpetuating the problem. The invention herein reinvigorates the objective within each of the three parties to profit from the property, by creating a new interest in the property.

The multi-variable auction and process of the current invention is created to address this fracturing of the home mortgage system, and to stabilize and restore home values back to higher appraised levels. The auction is a multi-variable, multi-party auction process that primarily includes the homeowner, the respective mortgage holders, and investors, which may be institutional. Investors may bid to finance all, or only a fractional portion of, the homeowner's new mortgage loan. The bidding platform facilitates an auction, which, in one embodiment, seeks to match the institutional investor's interest rate bid with the homeowner's monthly payment bid, resulting in a calculated principal amount, where bidding may be based upon the current FMV of the property, as determined by formal appraisal prior to bidding or some other quick valuation. (Note, several other embodiments for bidding are discussed later, which may also include bidding for the new principal loan amount, the loan term, the investors' risk-sharing fractional portion of the new loan amount, etc.). The bidding may also be based upon the homeowner's current cash flow, which may be provided by an independent analyst who reviewed the homeowner's financial data. The interest rate being bid may constitute a blending of a variable interest rate portion and fixed interest rate portion, where the variable portion is the interest rate that will be paid to the investor, and the fixed rate portion will be comprised of several components, including a small percentage to be allocated to an insurance fund. In one embodiment, the auction may include bidding on a principal loan amount that is in excess of the current FMV, but below the total outstanding lien balance.

In a first embodiment, successful bidding, which requires final agreement by all parties including all lien holders (or alternatively, legislation implementing a "Deemed Foreclosure" process which forces a "settlement" on the mortgage holder), results in a mutual rescission of the previous loan agreements, a locking in of the variable interest rate portion, and the issuance of: a "Time-Out Mortgage," which may be recorded; and issuance of a "Home Certificate" for the home's new principle loan. The Time-Out Mortgage may contain 'granting' language—like a deed—which may give the lender the right to take the property if the borrower goes into default and doesn't pay under the terms of the Home Certificate. The Home Certificate, in part, is an analogue of the traditional promissory note issued in a standard home financing arrangement; however, it comprises much more. The Home Certificate also incorporates an agreed upon sharing scheme for the "Deferred Recapture Amount," which provides the incentive to drive each of the parties to abandon their current, mutually non-beneficial positions, and participate in the auction and new financial arrangement. The Deferred Recapture Amount constitutes the difference between the total pre-auction lien amount on the property, and the new principal loan amount of the Home Certificate (which should be not less than the current fair market value)—where the new principle loan is for the FMV, the Deferred Recapture Amount is the realized underwater loan amount. Where the process results in a new principal loan amount which may be agreed upon to be in excess of the current FMV of the underlying property, the Deferred Recapture Amount will be less than the underwater amount. (Note that this process may be utilized for similar financing and propping up of mortgages on commercial properties, and therefore, use of the term "Home Certificate" herein is not in any way meant to be limiting of the use of the described instrument only as to single family "homes," and may be applicable to all real properties).

Several different schemes for sharing the Deferred Recapture Amount are elaborated upon hereinafter, as they each create additional synergy as to the success of the process because they serve to further incentivize participation in different ways, and appeal to different groups of people. These disclosed schemes are not an exhaustive list of the possible sharing scenarios—other allocations of the Deferred Recapture Amount to the transaction participants may be appropriate in a specific implementation of the Program, and only several of these possibilities are discussed later within the Detailed Description of the Invention. Each implementation of the Program may require different arrangements for allocating the Deferred Recapture Amount to the applicable parties. The appropriate implementing government agency, NGO, or Program Administrator will determine the particular arrangement for the specific implementation. The agreed upon Deferred Recapture Amount may be bid upon at, and set with the close of the auction, to be permanently fixed for the life of the loan, or it may be set so as to be modifiable thereafter based upon the financial behavior of the homeowner (e.g., excess monthly payment amounts being tendered). The existing government loan guarantee(s) and/or insurance may be transferred to the Home Certificate, but the government's exposure is reduced by the Program's introduction of a new zero-subsidy insurance fund.

In a second preferred embodiment, successful bidding, results in a mutual rescission of the previous loan agreements, a locking in of the variable interest rate portion, and the issuance of: a "Time-Out Mortgage Loan" in an amount that the new investor provides as new financing; a "Time-Out Mortgage" (the lien on the property) which may be recorded; and issuance of a "Home Certificate" in the amount of the home's new principle loan. In this embodiment, the Home Certificate, through which the new financing is provided, in part, is an analogue of a traditional Certificate of Deposit or Municipal Bond; however, it comprises much more. The Home Certificate in a preferred embodiment provides a choice to the investor in the event of a Home Certificate default—make a claim on the Program's insurance fund for the full remaining principal amount of the Home Certificate plus accrued but unpaid interest OR accept title to the home associated with the Home Certificate. Note: the investor gets to choose one option in full satisfaction on the Home Certificate. The Home Certificate's ability, in this embodiment, to opt to take the property in the event of a default on the Home Certificate is not supported by a lien, it is contractual under the terms of the Home Certificate. In the event an investor chooses to take title to the home, the government agency, NGO or Program Administrator will administratively or judicially, as the case may be in the particular state, take title to the home and transfer that title to the investor, or, if possible under applicable law, arrange for the investor to receive title to the home directly. In this embodiment, the Home Certificate also incorporates an agreed upon sharing scheme for the "Deferred Recapture Amount" (DRA). Where, in addition to the mortgage holder, there were other lien holders with an interest in the property who participated in the auction, each may be issued a Certificate of DRA to document their new interest in the Deferred Recapture Amount.

The process of either of the above two embodiments, which are disclosed in greater detail hereinafter, results in a reduction, to the homeowner, of the home loan amount down to the FMV of the home (or possibly a slightly higher principal amount accepted at auction), a stemming of the violation of the contract principal pacta sunt servanda, as agreements are instead renegotiated and then kept, to the benefit of all parties, rather than willfully abandoned, and being with the possible restoration of a portion of the benefit of the original agreement. The homeowner is able to remain in his/her home with affordable payments, the prior loan servicer is no longer unsuccessfully attempting to collect funds for the old loan, the prior note holder incurs a partial loss on the property, but rather than acquiring a devalued and unmarketable home through a lengthy foreclosure process, the prior note holder receives at least the amount of principle representing the home's current fair market value, plus a future share of the deferred recapture amount. The depressed home market stabilizes, back real estate taxes may be paid using funds from the auction, with future taxes being paid going forward by the homeowner, resulting in cash influx into state's economy. Investors not only receive interest on the principal sum that was invested, but have the prospect of a large bonus from their share of the deferred recapture amount, resulting in out-of-state investor funds going into a depressed local economy in the form of the new Time-Out Mortgages and Home Certificates. All of this serves to retain, if not grow jobs, as businesses move to the formerly troubled region because of its financially stable real estate market, which may spread to rest of state's economy.

The process of the current invention results in a Win-Win-Win-Win scenario. It benefits the homeowner who would otherwise have walked away from the home and accept a credit score plummet of roughly 160 points; the mortgage holder who would have had to execute the time-consuming steps of foreclosure to acquire a property it would not likely have been able to sell in the current climate; the investor(s) who receives a good rate of return on his/her investment, with the prospect of also receiving a significant bonus; and it benefits state and local economies by reversing the downward spiral caused by the current mortgage crisis.

BRIEF DESCRIPTION OF THE DRAWINGS

FIG. 3 is a flow chart illustrating the relationships formed as a result of a successful auction, as well as the obligations/benefits for each of the parties.

FIG. 6 graphically illustrates a comparison between two different types of scenarios for sharing of the Deferred Recapture Amount, a fixed share scenario, and a later varying scenario, which is the Homeowner Double Bonus Method.

FIG. 7A illustrates the first of three other scenarios for a later varying share of the Deferred Recapture Amount, being the Buy-In Return Method.

FIG. 7B illustrates the second of three other scenarios for a later varying share of the Deferred Recapture Amount, being the Increasing Return Method.

FIG. 7C illustrates the third of three other scenarios for a later varying share of the Deferred Recapture Amount, being the Decreasing Return Method.

FIG. 9B illustrates a screen shot of the website of the current invention, providing input screens for an Investor to enter required information.

FIG. 9D illustrates a screen shot of the website of the current invention, showing calculations performed to resolve differences in the parameters bid during the auction.

DETAILED DESCRIPTION OF THE INVENTION

Figure 1:
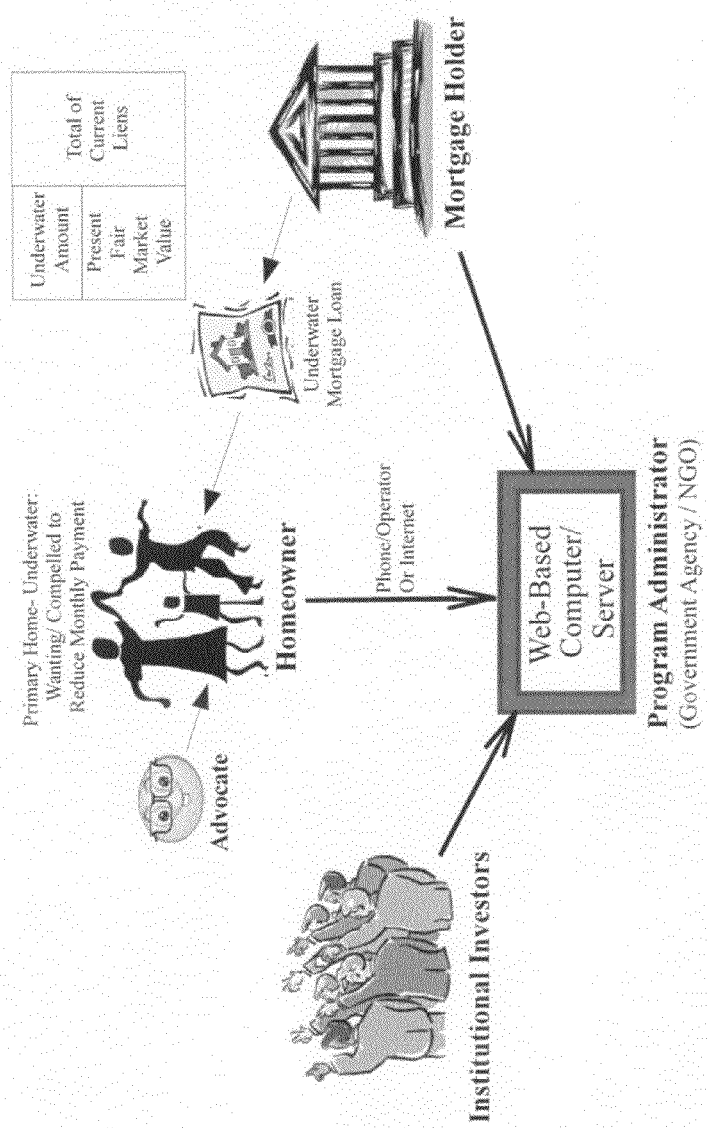
FIG. 1 is a graphical illustration showing entry into the system database of information for each of the relevant parties—the homeowner, the mortgage holder, and the institutional investors.

The present financial and economic crisis, largely fueled by significant ruptures in the fabric of home mortgage lending in this country has drawn much comment, not only on causes, but also on possible solutions, both short- and long-term. The focus of these solutions has been on federal government involvement in some form of a "bailout," at least of financial institutions caught in the deepening crisis, if not individual homeowners who are seeing the fruits of many years of hard work and saving, the underlying basis of the American dream of homeownership, flushed away in a tide of bad debt and questionable lending practices. Whatever form this government bailout assumes, it is unquestionable that the price tag for American taxpayers will be staggering, especially due to the government-backed insurance or guarantees on mortgages and/or mortgage-backed securities through Federal National Mortgage Association ("Fannie Mae"), Federal Home Loan Mortgage Corporation ("Freddie Mac"), Veterans Administration ("VA:), and Federal Housing Administration ("FHA"). If anything, the human toll will be even greater, as society will face increasing pressure from the displaced and disenfranchised.

In recognition of the crisis situation facing both our economy and our society, the present inventors have devised a novel form of financial instrument, or security, in some ways not unlike familiar instruments such as certificates of deposit, and a unique, and in a preferred embodiment, an auction-driven system to effectively stave off the growing epidemic of home foreclosures, which now almost resembles a run on a bank.

To aid in the understanding of the method and practice of the present invention that was discussed briefly in the summary of the invention, the following terms are presented and defined without intent to limit or otherwise constrain the invention disclosed and claimed herein, with a description of the process following thereafter.

DEFINITIONS

Lien Balance—the amount of any and all lien balances owed on and secured by a homeowner's property (real estate tax liens, federal, state and local tax liens, mechanic liens, etc.). The actual amount to be considered here may be dependent upon the state in which the property is located since property ownership and liens are creatures of state law. For example, in a state in which a foreclosure of a first lien nullifies any secondary lien, the Program may need to work only with the first lien as the secondary liens may be nullified legislatively or through operation of law.

Underwater Amount—the difference between the lien balance and the presently deflated current fair market value of the applicable property.

Deferred Recapture Amount—is the amount of the Lien Balance that is restructured through the Program. It is the difference between the Lien Balance and the principal amount of the Home Certificate.

Time-Out Mortgage—is the lien on the real estate which has been processed through the Program; in a preferred embodiment, it is held by the government agency or the NGO. (Note—a "Mortgage" refers to a "Deed of Trust" in certain Deed of Trust states, such as Arizona).

Time-Out Mortgage Loan—is the promissory note evidencing the loan issued by the government agency or NGO through the Program; and the principal amount, in a preferred embodiment, is arrived at by bidding of institutional investors and the homeowner within an online auction platform. (Note—Time-Out Mortgage Loans are recourse loans, and may thus avoid strategic default in non-deficiency states.)

Home Certificate—is the novel hybrid financial instrument of the present invention that is created at the end of the bidding process. It is in part the analogue of the promissory note (viewed from the real estate investor's perspective) issued in a standard home financing arrangement, but furthermore comprises an agreed upon sharing scheme for the Deferred Recapture Amount. In a preferred embodiment, the Home Certificate does not evidence a lien on the underlying property that it is associated with. In this preferred embodiment, in the event of a homeowner default that is not insulated from the Investor by the government agency or NGO using Program tools, the investor may choose either to take title to the underlying property or to file an insurance claim against the Program's insurance fund. In the event the Investor chooses to take title, the government agency or NGO will process the foreclosure on the lien and then transfer title to the underlying property to the Investor. The investor can view the Home Certificate as more of a callable Certificate of Deposit ("Callable" because it can be paid off partially or fully prior to the stated term ending, and a Certificate of Deposit because it has a stated principal amount—the amount the investor purchases the Home Certificate for and a stated interest rate—either the rate per the accepted calculated principal amount or as issued by the government agency in a fixed-rate security.) The investor may also view the Home Certificate as a fully insured callable Municipal Bond, due to the 100% insurance on Home Certificate principal and interest through the Program's insurance fund; in addition to the fully insured aspect of the Home Certificate, the ability to opt to take title to the property in the event of a Home Certificate default, adds a new benefit to the simplified view of the Home Certificate being a Certificate of Deposit/Municipal Bond.

Home Certificate Interest Rate—is the stated interest rate on the Home Certificate, which was agreed upon by the Homeowner and the Investor(s).

Home Certificate Monthly Payment—is the new monthly payment made by the homeowner, through the government agency, NGO, or Program Administrator, on the Home Certificate that the Investor receives. In an alternate embodiment, the Investor may receive interest payments quarterly instead of monthly.

Home Certificate Redemption—this occurs when the Homeowner repays the Time-Out Mortgage Loan and any amount of Deferred Recapture Amount not allocated to the homeowner, in full. Homeowner pays the Time-Out Mortgage Redemption Amount to the Program Administrator (which could be the government agency, the NGO or a third party engaged to administer the Program). The Program Administrator repays the Home Certificate Principal Amount to the Investor (return of capital), plus any accrued but unpaid interest, plus the amount of the Deferred Recapture Amount allocated to the Investor, if any (additional profit, which increases Investor's Actual Return above the Home Certificate Interest Rate). Program Administrator issues Satisfaction of Mortgage to Homeowner and releases security interest on underlying home.

Home Certificate Term—the length of time the Home Certificate is scheduled to be outstanding and generating interest for the Investor. In one embodiment, the term can be as little as 30 days and as long as ten years. The Home Certificate Term may affect the interest rate required by the Investor. By modifying the Home Certificate Term, the required interest rate for maximizing the Home Certificate Principal Amount can be achieved. While the interest rate curve is normal, a shorter term will allow for a lower interest rate and when there exists an inverse interest rate curve, a longer term will allow for a lower interest rate. Generally, by replacing longer-term Home Certificates with shorter-term Home Certificates, a needed lower interest rate to allow almost any Homeowner, including those who have experienced temporary or permanent job loss or catastrophic medical bills, to afford the monthly payment associated with the Time-Out Mortgage.

Base Time-Out Mortgage Monthly Payment—Fair Market Value of the home subject to a Time-Out Mortgage multiplied by the Time-Out Mortgage stated Interest Rate divided by 12—an amount calculated to provide the monthly payment amount that would be needed for the Time-Out Mortgage Loan Amount and related Home Certificate Principal Amount to equal to the Fair Market Value of the home as determined at time of creation of Home Certificate.

Time-Out Mortgage Redemption Amount—this is the amount that the Homeowner must pay to redeem the home underlying the Time-Out Mortgage from the Program and obtain free-and-clear title to the home. It is the sum of the Home Certificate Principal Amount plus the result of the remaining amount Deferred Recapture Amount less the homeowner's share of the Deferred Recapture Amount.

Initial Insurance & Fees—this is the amount charged for a program insurance premium and fees at the time a Time-Out Mortgage is created and substituted for the old mortgage; it is paid to the proper payee by the Program Administrator out of the funds received by it on creation of the Home Certificate. It is calculated by multiplying the Home Certificate Principal Amount by the Initial Insurance and Fees Percentage. In one embodiment, the collected amount of Initial Insurance and Fees are distributed to a Home Investor Insurance Fund for program insurance, and to the Program Administrator for Program Administrator Fees and any additional fees, such as license fees, to the effectuate the system of the invention. In an alternative embodiment, this charge could be reduced or waived completely to allow certain special cases into the Program.

Monthly Insurance & Fees Percentage—expressed as additional "interest rate" percentage that is applied to the Home Certificate Principal Amount to determine the portion of the Time-Out Mortgage Loan Monthly Payment that is paid, in one embodiment, to a Home Investor Insurance Fund for the monthly insurance premium, or to the Program Administrator for the monthly Program Administrator fee. It may also be calculated by dividing an annual insurance & fees percentage by 12.

Monthly Insurance & Fees—this is the amount charged to the Homeowner for monthly insurance premium and fees. It is paid as part of the Time-Out Mortgage Monthly Payment to the Program Administrator and then is paid by the Program Administrator to the proper payee out of the funds received by it. It is calculated by multiplying the Home Certificate Principal Amount by the Monthly Insurance and Fees Percentage.

Deferred Recapture Redemption Amount—the portion of the Deferred Recapture Amount that the Homeowner must pay in order to redeem the home underlying the Time-Out Mortgage from the Program. It is calculated as the remaining Deferred Recapture Amount less the Deferred Recapture Amount allocated to the homeowner. In certain embodiments, some or all of the Deferred Recapture Amount not allocated to homeowner are amortized over the term of the Home Certificate or other measure. Any such amount, which is amortized, would be re-allocated to the homeowner.

Investor's Deferred Recapture Redemption Amount—this is the portion of the Deferred Recapture amount allocated to the Investor, which may be bid on during the auction. In one embodiment, it may be fixed initially at 50% of the Deferred Recapture Redemption Amount; however, it can be set at any amount, and may even be zero.

Mortgage Holder(s)' Deferred Recapture Redemption Amount—this is the portion of the Deferred Recapture amount allocated to the Mortgage Holder(s). In one embodiment, it may be fixed initially at 25% of the Deferred Recapture Redemption Amount; however, it can be set at any amount, and may even be zero.

Homeowner's Deferred Recapture Redemption Amount—this is the portion of the Deferred Recapture amount allocated to the Homeowner. In one embodiment, it may be 25% of the Deferred Recapture Redemption Amount; however, it can be set at any amount, and may even be zero.

The Process:

Initial contact with the system for implementation of the process (see FIG. 1), from the homeowner/mortgagee side or from the mortgage holder side, may be achieved through a variety of communications means. These may comprise a personal computer, a hard-wired telephone, or a cellular telephone, by way of example (and without limitation). In the alternative, means such as a video phone, a personal digital assistant with appropriate network connectivity, an interactive television service, or other means of communication not yet technically available, may serve as appropriate means of contact. In addition, a personal, face-to-face interview, including with a non-profit housing finance counselor, may be used for initial contact with the system and to facilitate intake of the customer data into the system to initiate the process of the claimed invention. Such personal interview can be conducted at a publicly accessible location maintained by the operators of the system (Program Administrator) of the present invention. Alternatively, participating mortgagors or sellers/underwriters of financial products may dedicate resources to facilitate intake of new customers into the system. It is also possible for workers at a government agency or an NGO, or even third-party contractors not directly participating in the system, to provide customer intake services, either through personal interviews or through technology portals not available to some potential homeowner participants.

When the initial participant contact arises through a telephone call to a nationally advertised toll-free number associated with the system of the present invention or, alternatively, local numbers that can serve an additional function in identifying callers with sources of referral, then the call is routed to a Voice Switching and Routing Application residing on a server. The calls received by the Network Application are preferably handled through an automated call answering/routing routine using a menu of options, and voice scripts associated with such options designed to function in a manner somewhat similar to the handling of Web-based inquiries received through the Web Application. The caller provides the Voice Switching and Routing Network Application, in response to specific voice prompts, a unique routing identification datum, such as zip code, whereby the Application directs the caller to the appropriate processing agent.

Figure 10:
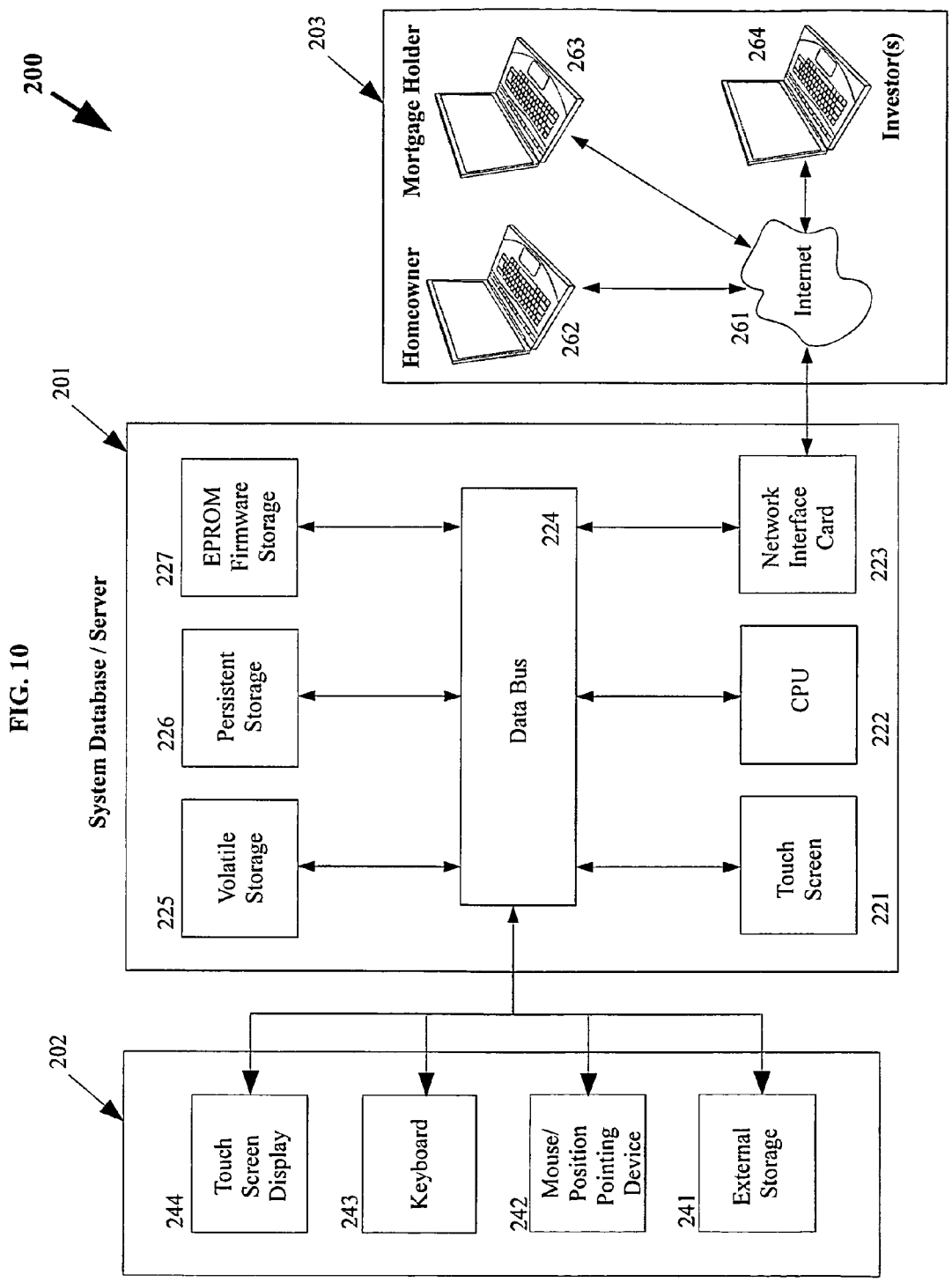
FIG. 10 a schematic of an exemplary computing unit interacting with external peripherals and other computers over the internet, and being capable of running the software of the current invention.

Typically, a prospective homeowner participant in the system of the present invention, utilizing a Web browser program (such as Microsoft Internet Explorer®) resident on the homeowner's personal computer ("PC"), may navigate to the Auction Web site associated with the system. One of skill in the art would recognize that such URL would link the homeowner, either directly or indirectly, to information within a system database, preferably resident on one or more servers used to facilitate homeowner entry into the Program. It should be noted that although the process disclosed herein may, in a preferred embodiment, be conveniently conducted through the use of at least three or more computers and a server, the arrangement of which may be represented by that shown within FIG. 10, the process may alternatively comprise the relevant parties being physically co-located in a neutral forum to personally conduct the auction in accordance with the teachings of the current invention, or may alternatively be conducted by some combination of those two arrangements.

Upon contact, via whatever mechanism, the homeowner or the mortgage holder may provide personal and property/mortgage information to the system. Depending on the status of the current mortgage on the property, the information may be as simple as contact information (name, address, telephone number, etc.), or perhaps a social security number (for a government/tax reporting requirement), or far more detailed personal financial information sufficient for at least initial analysis in regard to the financial instruments of the present invention. Such data may be stored in an appropriate customer database in the system, for use not only in the transaction that prompted the contact, but for future transactions, including an auction. Thus, upon contact with the system of the invention, the initial query from the system to the customer may be whether the customer has previously contacted the system and provided customer data. If the answer is negative, then the system may inquire as to the current status of the mortgage on the caller's property and may also elicit a level of customer data appropriate with that status. Where the customer has previously interacted with the system, then the system may determine whether any of the information previously stored on the server needs to be updated, or supplemented to match the level of information needed for the process.

It should be recognized that the necessary participation by investors would require similar registration information being entered into the system, in advance of being invited to, and being able to, bid at an auction. In an alternative embodiment, the existing mortgage holder can choose to act in the role of investor in this process. This would be considered a first opportunity to participate. Other institutions could be given the next opportunity to participate as investor, such as local community banks, thereby, allowing local community banks to support their local communities by "lending" through the Program to local homeowners. Other lending institutions could be given the next opportunity to participate as investor. After all lending institutions have chosen not top participate as investor, other non-mortgage lending institutions could participate as investor. Using this procedure, this Program could integrate into the concept of mortgage funding through mortgage lending institutions that currently exists into the more efficient and effective process of the current invention while allowing the federal government to bow out of the mortgage guarantee and insurance market as has been recently announced.

Where the consumer's query (being a query by either the homeowner or the mortgage holder) is an indication of intent to pursue participation in the Home Certificate Program, the Web Application may proceed according to defined steps. These steps of further interaction between the consumer and Web Application may involve collecting additional information from the prospective participant needed to create a full-featured record within the system database. Receipt by the Program Administrator of this information may trigger an email invitation to both the mortgage holder and the homeowner to participate in an online auction, and a preliminary notice to the investors to stimulate interest in the auction, including the property location and description. Any solicitation of investor interest and eventual sale of Home Certificates to investors shall comply with applicable securities laws. The invitation may provide detailed information, including instructions for all of the options that may be up for bid by each party when participating in the multi-variable auction, and may also recommend some tentatively scheduled time frames for participation by the homeowner and mortgage holder in the auction. The invitation may ask for confirmation from both the homeowner and the mortgage holder of definitive agreement to participate in the auction, which when selected, may be transmitted electronically back to the server of the Program Administrator. In an alternative embodiment, Home Certificates may carry a fixed interest rate. In another embodiment, Home Certificates may be sold to participants in an aggregate auction similar to the manner Treasury Bills are now auctioned by the United States Treasury Department.

Definitive agreement to participate may trigger one or more e-mails suggesting a series of different time frames in which the auction may be conducted, where those times may then be rank ordered by the homeowner and mortgage holder, and a final time frame selected based on that order by an algorithm stored in the server. The time frame may not generally be critical, as the agreement to participate may be for an auction that may have a beginning time and an end time that may span hours, or even days. However, where an auction is to remain open for a period of time spanning more than one business day, a safety may be built into the auction, due to volatility in the markets, so that any bids submitted to the auction must expire as of the close of any business day during the auction period, or at the end of some pres-selected time interval, and then at the opening of the next business day, the bids may be expressly or automatically re-submitted or renewed. Option may permit the party selecting the time frame before the bid is to expire.

The selected time frame may be sent to both the homeowner and mortgage holder, as well as all of the registered institutional investors. A means of requesting a delay in the auction start or end may be provided, however, with a reasonably long period of time being provided for participation, such a request should not be factor, unless unusual circumstance intervene, such as, for example, storm damage to the property or other unforeseen consequences, or such as the determination of a need for additional information about the property that had not yet been acquired or recognized as being essential.

During the auction, each of the parties may have a number of options that they may be able to bid upon. As stated previously, it may be recognized by the mortgage holder, that acquiring the title to a home that is underwater, particularly in real estate markets that are extremely soft, means that time consuming and costly foreclosures may only thereafter result in difficulty in reselling the property even for what is the reduced "current market value." Also, the homeowner who may be contemplating walking away from the original loan obligation (referred to by the media as "strategic default") and is otherwise willing to accept foreclosure due to the hugely diminished home value, even with its detrimental effects to credit history and reduced prospects for other near-term homeownership, will recognize the advantage of renegotiating with the mortgage holder for not only a new interest rate on the refinanced loan, but also for the amount of the loan that will be secured by the property.

The total of all current liens against the property at auction may in some cases only be a single home loan, and in other cases it may include additional subordinate property loans, real estate tax liens, federal, state and local tax liens, mechanic liens, etc. As seen in the example in FIG. 1, the total of the current liens against the property at auction is greater than the property's current fair market value. This difference, being the "underwater" amount, should realistically represent a range within which the new loan amount may be set. This new loan amount is documented in a new type of hybrid financial instrument called a Home Certificate, which is in part a type of promissory note or bond-like instrument, and which is discussed further hereinafter. Although the new loan amount would not likely be set below the present fair market value, that nonetheless remains a possible outcome of the auction. Because the homeowner is actually getting a significant reprieve—by way of the reduction in the loan amount at auction without suffering adverse consequences in terms of years of poor credit ratings, by not having to move belongings to a rental property, and by not having to forego the total loss of the equity that was originally invested in the home—the homeowner may, in many instances, be naturally motivated to bid a monthly payment amount that will result in the new loan principal amount being in excess of the home's current fair market value. The new home loan amount could be set to reach or even exceed the current total amount of liens, but that scenario is unrealistic, as that scenario represents the current situation that invariably results in an irresolvable impasse, but again, while it is not expected, it nonetheless remains a possible outcome of the auction. If the new loan amount is required to be not less than the current total amount of liens, in order to offer the homeowner a lower monthly payment, albeit without lowering the principal amount owed, Home Certificate terms would likely need to be short unless there exists an inverse interest rate curve in order to access the very low annual interest rate needed to obtain the result of a larger principal amount with a lower monthly payment. Although this would expose the homeowner to more interest rate risk, it is a viable alternative where the parties cannot agree on a new principal amount which is less than the amount of the existing liens.

Resetting of the total loan amount secured by the home may require therein that the homeowner and all mortgage holders bid at auction for an agreed upon amount, with the mortgage holder, upon accepting the final terms of the auction, additionally agreeing to a mutual rescission of the old home loan agreement. It is worth noting that in certain states like Arizona and Nevada, legislation may be passed to encourage or even mandate auction processes described herein or create a procedure for "Deemed Foreclosure" to stem the crisis, particularly because mortgage holders are often not even open to renegotiating existing home loan interest rates, especially where the owner is slightly behind in the monthly payments. We have coined the term "Deemed Foreclosure" in order to use a name that a person who is not expert in real estate or legal matters would recognize and understand. The concept of Deemed Foreclosure is similar to an eminent domain proceeding. In a Deemed Foreclosure proceeding, the state would legislatively mandate acceptance of a pay-off amount on the existing mortgage loan that is not less than the fair market value of the underlying property. In the most likely embodiment, the legislatively acceptable amount would be greater than the fair market value by an amount that would be sufficient to fund the initial premium and fees payments and deliver a payment to the Mortgage Holder which would still be in excess of the fair market value of the underlying property. The Deemed Foreclosure "proceeding" would likely involve the state and the homeowner with the affect upon any existing lien holder being a result of the Deemed Foreclosure proceeding rather than the Deemed Foreclosure proceeding involving parties who hold liens on the property. Furthermore, because of the efficacy of the process herein to resolve the problem by placing each party in a better position than the party would be in absent this process, it is anticipated that participation will be voluntary, and need not be mandated.

In view of the tendency of all of the parties (homeowner, mortgage holder, and investors) to be obstinate about changing their anticipated course of action—being a strategic default, foreclosure, and a withholding of investment funds—the auction and process of the current invention incentivizes participation in a way that is critical, as it improves the financial position of each and every participant (taking into account current and future interests), by brokering a strategic compromise and by creating a new interest in the property. It therefore creates a new an unexpected result, which is to affect each party so as to convert disinterest into significant interest for the exact same property. The incentive is provided through bidding by each party for a portion of what is referred to as the Deferred Recapture Amount. As seen graphically in the top left portion of FIG. 3, the resetting of the total loan amount secured by the home to be somewhat above the present fair market value leaves a difference with the total of the home liens prior to auction. It is this difference which comprises the Deferred Recapture Amount. Where the new Home Certificate principal amount equals the present fair market value, the Deferred Recapture Amount will equal the underwater amount.

This Deferred Recapture Amount represents a portion of a pre-"run-on-the-bank" or pre-"housing crisis" value of the property, which may not even be its highest appraised value, because in some cases, an initial 10% or 20% down payment may have resulted in the home mortgage—the only lien—being well below that appraised value. The process anticipates that due to the generally cyclic nature of the economy, and that once the panic run to abandon property is reversed, that home values will be restored in the not so distant future—because the population keeps increasing, and everyone needs a place to work and home to live in, so the laws of supply and demand will eventually overcome the current property malaise. The process of the current invention accelerates the normal progression by first resetting the home loan through the Program to a presently agreeable and affordable level, and by furthermore auctioning off a portion of the property's lost historic value as a share in the Deferred Recapture Amount. There are many different scenarios for sharing, which are discussed hereinafter. (Note—in one embodiment the share of the Deferred Recapture Amount may be bid on at auction, particularly where it is a fixed fractional share, while in another embodiment, a more complex implementation for sharing the Deferred Recapture Amount may be more appropriately determined and implemented by the Government Agency, NGO, or Program Administrator.) However, it must be emphasized that the multivariable auction places everyone in a new and better position, under conditions favorable to all.

The only impediment is that each party must forego any resentfulness as to the prospect of the other parties similarly benefiting by an improvement in their respective positions. If each party utilizes a cost-benefit analysis and does not consider the emotional aspects of the transaction, the benefits will become crystal clear. The choice is also clear that either the homeowner and the mortgage holder must both suffer the consequences of foreclosure, while the investor has to seek better places to invest, or all three parties—homeowner, mortgage holder, and investor—can each immediately become more prosperous from an almost-certain bonus from the restored value as well as reducing the number of vacant properties that would otherwise serve to further reduce property values and possibly even reduce local tax revenues thereby furthering the death-spiral nature of the current malaise in housing. The mortgage holder avoids strategic homeowner default or having an inventory of foreclosed and unmarketable properties and instead receives an income stream that is equivalent to what would have been obtained, had it been possible, through foreclosure and resale of the property, plus has the bonus of a share of the original loan amount that would otherwise have been forfeited by the foreclosure; the most likely scenario is that the mortgage holder will obtain the most return on its investment through this Program rather than through a judicial or procedural foreclosure, deed-in-lieu, or short-sale. The homeowner receives a significant reduction in the monthly payments, which may become comparable to the rent that would necessarily have been paid after accepting foreclosure and leasing the home down the block, by instead accepting a reduction in the home's basis through an agreement to share a portion of its restored value, which furthermore permits the homeowner the possibility of receiving his/her original down payment in the form of future appreciation. If the homeowner does an appropriate cost-benefit analysis, the homeowner will realize that offering a monthly payment up to the amount that the homeowner would otherwise pay in rent for an appropriate housing solution is better than allowing the home to be foreclosed, which would allow the homeowner to salvage his/her credit rating, keep the kids in the same schools, maintain relationships in the community, etc. The investor not only obtains a fair monthly income stream for his investment, but has an all-but-certain future bonus by way of a share in the Deferred Recapture Amount. The portion of the Deferred Recapture Amount allocated to each bidding party at auction is documented within the Home Certificate, or in an alternative embodiment, in another Certificate called a "Loss Recapture Certificate" or another similar name.

The investors may additionally be incentivized to participate by being permitted to bid for a fractional share of a Home Certificate principal amount at each particular home refinance auction. This bidding arrangement at auction therefore provides the investors a sense of security by only bidding on home loans where the investor considers both the homeowner and property to be favorable, but also further limits risk therein by sharing of that risk with other investors. This permits the investor to create his own select "pool" of properties that has been bought into, rather than blindly buying into a pool that may contain hidden toxic assets.

Figure 2:
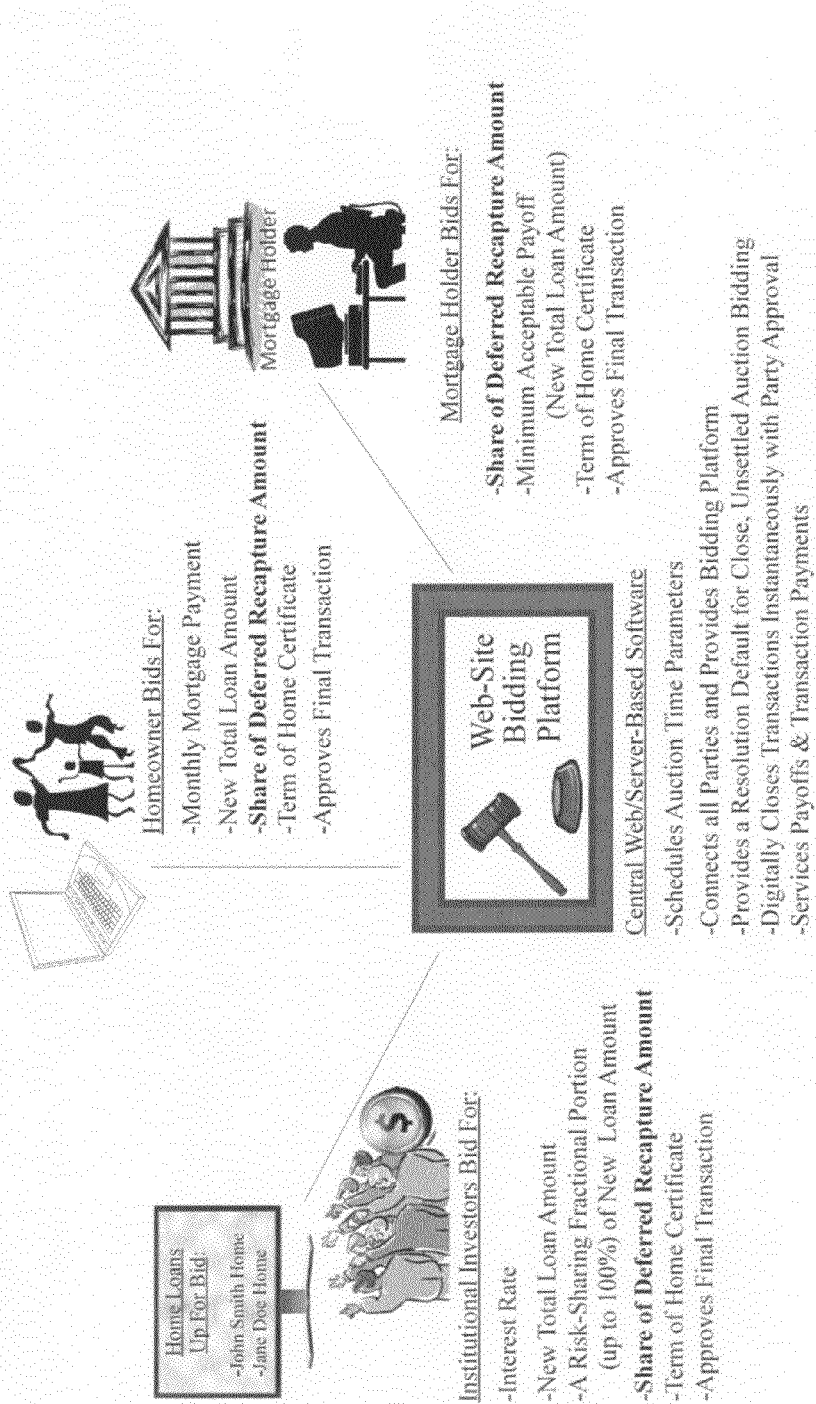
FIG. 2 is a graphical illustration showing the web-site auction platform, and the interactions therein by the homeowner, the mortgage holder, and the institutional investors.

A summary of the bidding process, as seen by each of the three parties, is shown in FIG. 2. The homeowner may place bids for the variables comprising: the new total loan amount, the monthly mortgage payment, and a desired portion of the Deferred Recapture Amount. The investors may place their respective bids for the variables comprising: the new total loan amount or maximum amount of loan that would be considered (Note: the investor views the principal amount as an "investment" since the Home Certificate is an investment in a hybrid security not an amount to fund a traditional loan), the interest rate on the new loan, a desired portion of the Deferred Recapture Amount, and a desired fraction of the home loan that the investor is offering to finance, being in standard increments (E.g., a 10%, a 25%, a 33%, a 50%, a 66%, or a 75% share of the loan amount although in the preferred embodiment, the investor would always select 100%). The mortgage holder (possibly through the current servicer as a fiduciary for the mortgage holder) may bid for a minimum payoff amount—the new total loan amount (less fees) and the Deferred Recapture Amount, and must give final approval for the transaction, as his consideration for the new agreement is the rescinding of the prior loan agreement. The rescission would be mutual with the acceptance by the homeowner of the auction's outcome, by giving his/her final approval for the transaction.

Figure 4:
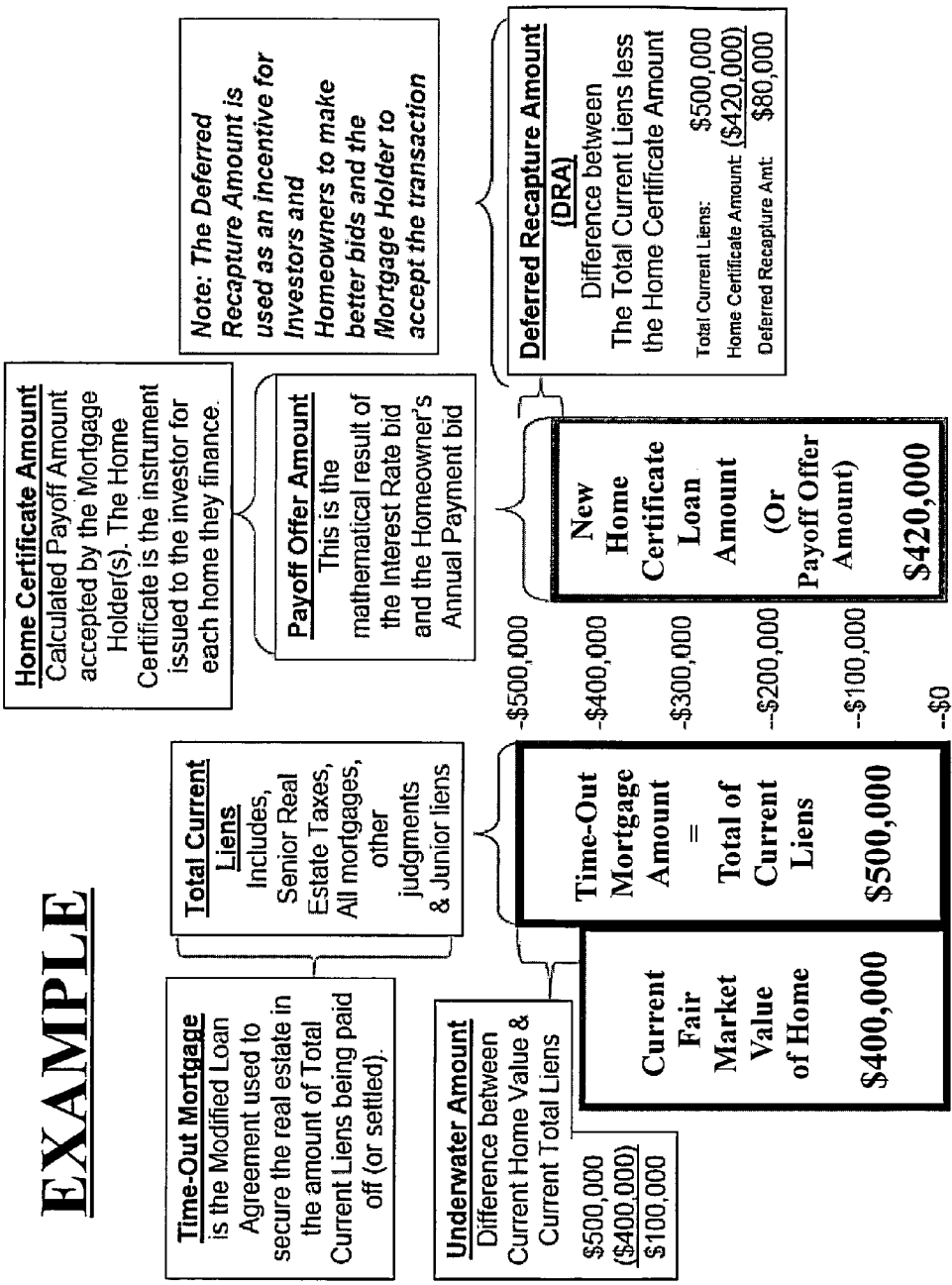
FIG. 4 graphically illustrates an example of the auction-type refinancing of an underwater mortgage.
Figure 5:
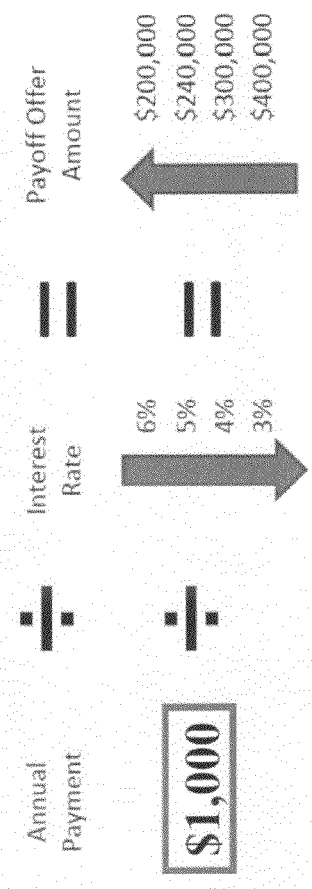
FIG. 5 graphically illustrates two different aspects of the current invention that seek to drive up the value of real property secured by underwater mortgages using market forces.

The relationships formed by successful bidding at the auction are graphically illustrated in FIG. 3, as well as further aspects of the invention illustrated, which will be discussed in the following paragraphs. An example of a successful auction process according to one embodiment of the current invention is shown in FIG. 4. In the example, the current fair market value of the home is $400,000, the amount of pre-auction liens totaled $500,000, and the new total home loan amount from the auction is $420,000, resulting in a Deferred Recapture Amount of $80,000. The total interest in the property remains at $500,000, because of the agreement to share the Deferred Recapture Amount, and therefore a new Time-Out Mortgage and in an alternative embodiment, other Certificates such as a Loss Recapture Certificate, may be issued to convey these interests, while the Time-Out Mortgage Loan documents the loan repayment obligation. The Home Certificate principal amount may be referred to as a "Payoff Offer Amount," as seen within FIG. 4, because of the effect of certain scenarios for sharing of the Deferred Recapture Amount that are discussed later. It may also be referred to as a "Payoff Offer Amount," because in an alternate embodiment of the current invention, the participants may not actually specifically bid directly for the amount of the new total loan secured by the home. Instead, as stated in FIG. 4, a Payoff Offer Amount to the mortgage holder may be generated by only matching the homeowner's monthly mortgage payment bid with the investors interest rate bid, as those are the only three interrelated variables. Since the payoff amount is likely the most crucial number to the mortgage holder, the auctions may more often be successfully completed by having the participants bid directly on that amount. This is especially true where the homeowner actually has the means to make his significantly higher current monthly payment, but is otherwise going to commit a strategic default due to the severe devaluation in his/her home's value. In another variation of that alternate embodiment, which is illustrated on the bottom of FIG. 5, market forces may be used to prop up the underwater mortgage by instituting, at auction, an inverse relationship between the interest rate and the payoff offer amount, so that when the interest rate is decreased, the payoff offer amount increases.

The bidding, which may occur on an invitation-only, password secured, bidding platform of the auction website, may have each participant selecting from a menu of values or alternatively typing specific values into a fillable form. An algorithm on the server supporting the website's bidding platform may then match an interest rate bid by one or more of the investors with a monthly payment bid by the homeowner. The algorithm of the software may also, prior to revealing what each party has bid, make certain default suggestions to encourage more reasonable bidding, because, for example, the mortgage holder(s) may be ordinarily tempted to bid for a total loan amount closely approaching the total of the prior liens, while the homeowner may ordinarily be tempted just to bid at the current fair market value of the home. A default suggested starting point for bidding on the total home loan amount may be an amount that is the current fair market value plus a percentage of the underwater amount, for example current FMV plus 50%, which would allocate the reduction equally. The algorithm may also make matching suggestion for the deferred recapture amount, based upon the new total loan amount. For example, where the new total loan amount was current FMV plus 25% of the underwater amount, the ratio of the Deferred Recapture Amount split between the homeowner and mortgage holder may be similarly apportioned. The current fair market value may be obtained prior to the auction by a conventional home appraisal, or by some other quick valuation method, such as a survey of online listing of sales of home in the area that are similar is size, style, etc. Many online sites contain this information, such as homes.com, realestate.com, domania.com, etc.

It must be recognized that if the bidding is time-sensitive, and the auction is about to end, that both parties may hold out from making small changes to their bid, anticipating that the other participant might cave-in and move the final few steps, which could very often result in a failed auction when the negotiation has, in actuality, almost successfully been completed. Therefore, the auction software on the server may include a default resolution, wherein, for example, when the bidding by the homeowner, the mortgage holder, and the investors for the portion of the Deferred Recapture Amount totals less than 110% (homeowner wants a 33% share, mortgage holder wants a 35%, and investor wants a 40% share, totaling 108%), a sharing default algorithm may modify each of the bids in the final minutes of the auction to reduce each bid in proportion to the total amount bid (homeowner gets 33/108=30.6%, mortgage holder gets 35/108=32.4%, investor gets 40/108=37.0%), which would of course be subject to final approval by each party. This type of fixed fractional sharing of the Deferred Recapture Amount is illustrated graphically in the top of FIG. 6 using a pie chart, where, for ease of illustration, the shares are 25%, 25%, and 50%, respectfully. A default resolution algorithm may similarly be used for other bidding parameters of the auction. To the extent that there are second, third, or even fourth Mortgage Holders/Lien Holders, each may have the control to bid based on that interest, and have the power to reject or accept the final transaction, subject, of course, to acceptance by a more senior Mortgage Holder/Lien Holder.

To accept a proffered bid, a commitment document in some form may be generated that binds the participants to the proposed transaction according to the terms of the accepted bid. The commitment document may be accepted or ratified by the participants, either through a Web Application, or through alternative means such as a facsimile document service. Alternatively, an electronic closing conducted by the auction website may use digital signatures resulting in the issuance of a Time-Out Mortgage Loan and a Time-Out Mortgage against said home, with subsequent physical recording of the mortgage or alternatively, a digital recording of the mortgage on an appropriate website published by the state, and issuance of a Home Certificate, and, in an alternative embodiment, other Certificates such as a Loss Recapture Certificate.

As an incentive for a Homeowner to enter the program and negotiate a more mutually advantageous outcome, legislation may additionally provide that no adverse credit reporting is allowed for a homeowner that willingly enters the Program. This uses market forces to make it more likely that a Mortgage Holder/Servicer/Insurer/Guarantor will accept a transaction which results in sharing of the Deferred Recapture Amount.

The auction software may also provide, as seen on the bottom of FIG. 6, an option for the participants to elect for a type of sharing of the Deferred Recapture Amount that may vary after the close of auction, depending on the homeowner's financial behavior, in terms of the amount of the monthly payments being made by the homeowner. The scenario at the bottom of FIG. 6 is referred to as the "Homeowner Double Bonus Method," because the homeowner is incentivized to increase the monthly payment being made to be in excess of the required amount. When the homeowner increases the monthly payment, he/she in turn is rewarded two times the amount that the increased monthly payment would serve to increase the total home loan amount. For example, where the homeowner pays an additional $75 over the base monthly payment, this essentially constitutes an offer to increase the home loan amount (a higher "Payoff Offer Amount") by 18.75%, and the homeowner is therefore granted twice that amount, and earns a 37.5% share of the deferred recapture amount. So, for the example used herein where the Deferred Recapture Amount is $80,000, the homeowner would earn a share amounting to $30,000. The homeowner may be provided an option on monthly payment coupons to dedicate these additional payments, rather than going towards payment of additional principle and interest, to instead be for obtaining the higher payoff amount to gain a greater share of the Deferred Recapture Amount. This gives the homeowner the option to secure higher amounts of equity, upon recognizing that the market is improving, which serves to use market forces to drive up the value.

Another scenario for sharing of the Deferred Recapture Amount is called the Buy-in Method, which is illustrated in FIG. 7A. In the Buy-In Method, for each dollar of monthly payment by the one or more homeowners above a payment required by the Time Out mortgage Home Certificate Amount exceeding the fair market value of the home, the Homeowner keeps that same percentage (the percentage that the Home Certificate Amount exceeds the fair market value of the home) of the Deferred Recapture Amount upon sale.

Another scenario for sharing of the Deferred Recapture Amount is called the Increasing Return Method, which is illustrated in FIG. 7B. In the Increasing Return Method, for each dollar of monthly payment that results in the Home Certificate Amount exceeding the fair market value of the home, the Homeowner keeps that same percentage (the percentage that Home Certificate Amount exceeds the fair market value of the home) plus a bonus that ever increases of the Deferred Recapture Amount upon sale.

Another scenario for sharing of the Deferred Recapture Amount is called the Decreasing Return Method, which is illustrated in FIG. 7C. In the Decreasing Return Method, for each dollar of monthly payment that results in the Home Certificate Amount exceeding the fair market value of the home, the Homeowner keeps that same percentage (the percentage that Home Certificate Amount exceeds the fair market value of the home) plus a bonus that ever decreases of the Deferred Recapture Amount upon sale.

It is expected that the these loans would be amortized over an agreed to period of time, such as a 30 year period, to create payments that are affordable; however, because the Investors and the Mortgage Holder will likely want to receive their bonus in the Deferred Recapture Amount sooner, the Home Certificate may have a term being less than that, and it may also be another variable that is bid on at auction. Although the Home Certificates may be issued for a short duration, for example, only 6 months, it is expected that a term will be selected that is long enough to reasonably ensure the return of the property's lost value. In one example the term may be on the order of up to about 10 years or longer. In an alternative embodiment, the portion of Deferred Recapture Amount allocated to a particular participant may be split amongst new participants that take the same position; for example, if 1 year Home Certificates are used in a particular homeowner instance over a period of 10 years, each of the Home Certificate owners may receive $1/10$ of the Deferred Recapture Amount allocated to the new Investor position; any partial allocation may be used to implement this splitting of the full allocation. At the end of the term of the Home Certificate, and even prior to that time, several mechanisms may be used to trigger payment of the portion of the Deferred Recapture Amount not allocated to the homeowner to the investors and mortgage holder and any other participants that receive an allocation of Deferred Recapture Amount, such as where the homeowner sells the property before the expired term because strong market conditions exist sooner, or if the homeowner independently decides to payoff off the amount to acquire sole interest in the property, or if the homeowner refinances the property at an earlier time using a convention mortgage loan. The Investors and the Mortgage Holder may also receive their expected bonus sooner by making the Home Certificate transferrable to permit reselling of the notes. In an alternative embodiment, the unpaid portion of the Deferred Recapture Amount payable to participants other than the homeowner may be reduced over time, with some or all such participants being reduced possibly even to zero. In an alternative embodiment, at a specific time, the unpaid portion of the Deferred Recapture Amount payable to participants other than the homeowner may be paid from the Program's insurance fund. It is contemplated that there may be many implementations of this Program and each implementation may include some of the same Program components and options while others may include different components and options.

Another feature of the current invention is illustrated in FIG. 3, which involves the guarantee on the new Home Certificate.

Figure 8:
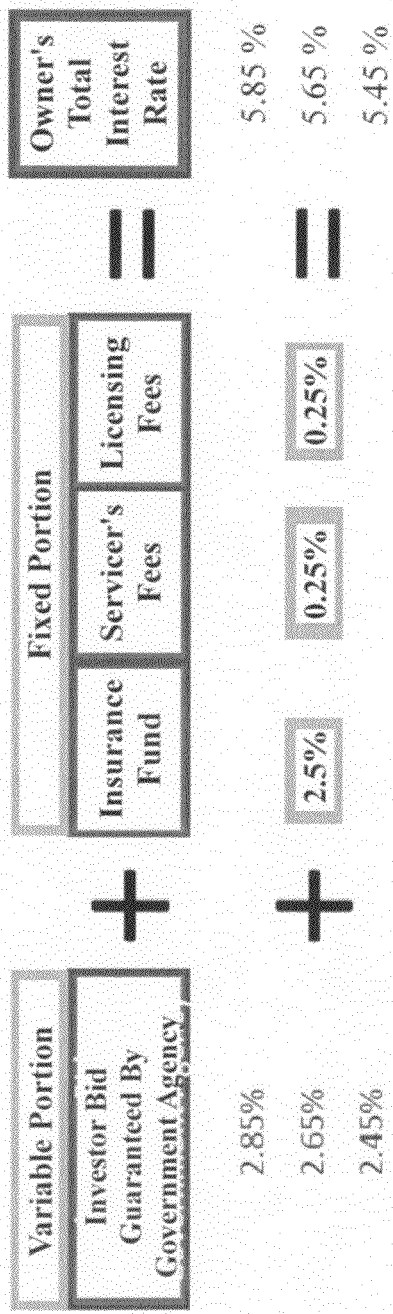
FIG. 8 graphically illustrates the breakdown of the investors "interest rate" bid.
Figure 9A:
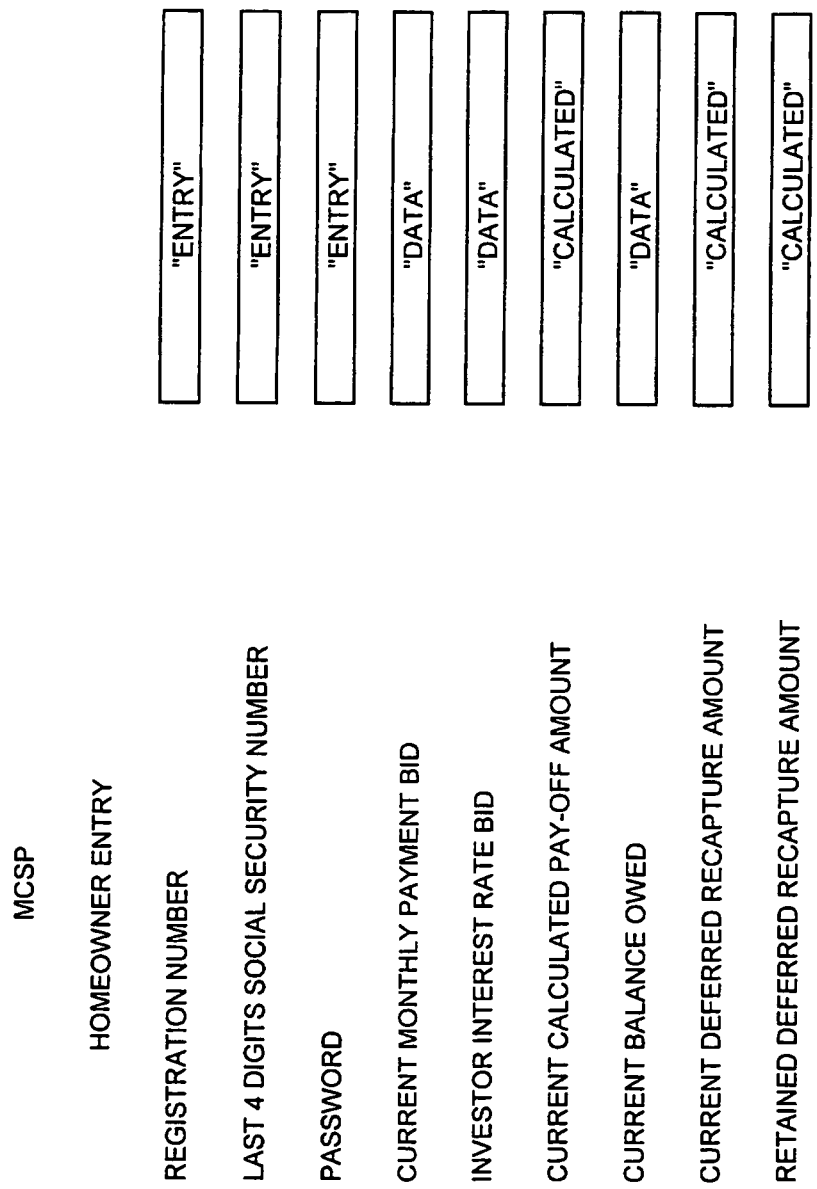
FIG. 9A illustrates a screen shot of the website of the current invention, providing input screens for a Homeowner to enter required information.
Figure 9C:
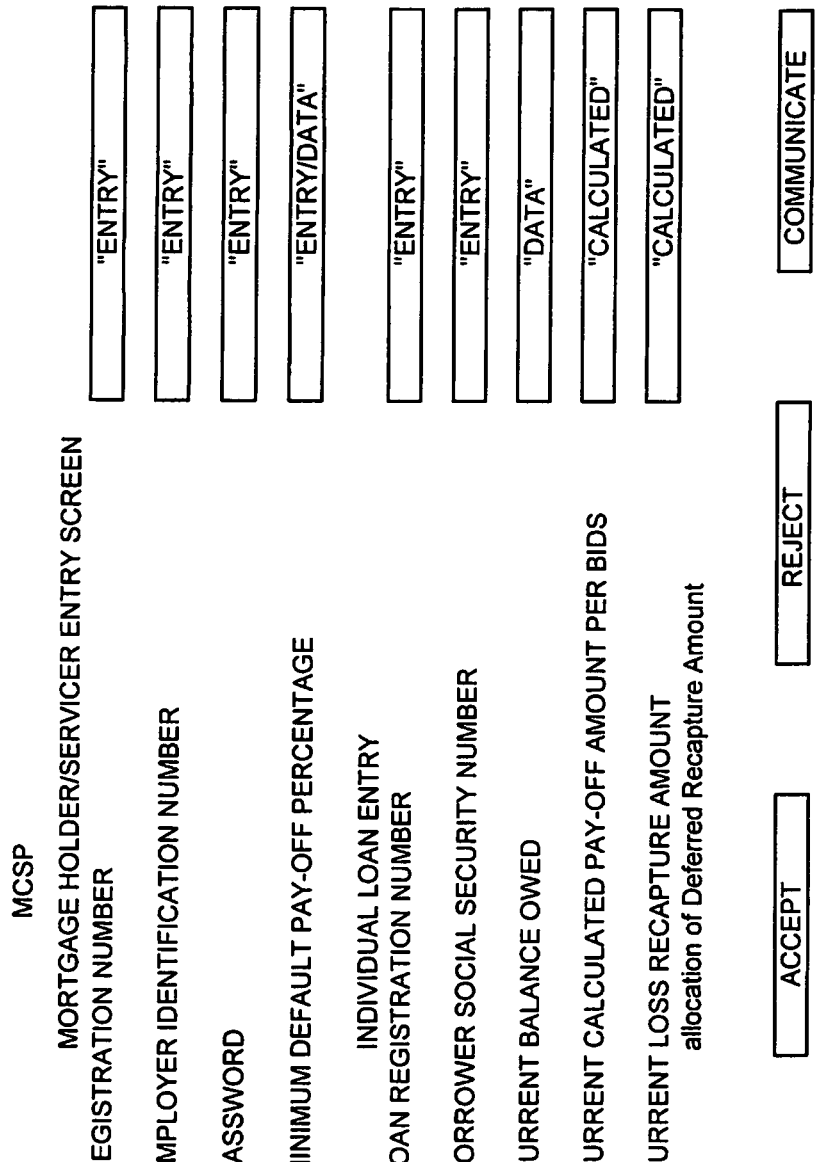
FIG. 9C illustrates a screen shot of the website of the current invention, providing input screens for a Mortgage Holder/Servicer to enter required information.

In a preferred embodiment of the present invention, a guarantee insurance fund is established and from each successful auction, may receive an initial contribution being a percentage of the Home Certificate principal amount and monthly insurance payments. As seen in FIG. 8, the fixed portion of the interest rate bid on at auction may comprise, for example, a 2.5% amount being allocated as monthly payment into the insurance fund. The actual percentage rate will be determined during Program implementation and may vary both within a particular implementation and among different implementations. This type of guarantee fund will function in a manner similar to existing federal insurance fund guaranteeing Small Business Administration (SBA) loans. The existence of such a fund provides a considerable benefit to potential Investors (purchasers of the Home Certificates) and drives further sales of same. The obvious benefit to enhanced sales of the Home Certificates is that such sales reduce the projected reliance on taxpayer funds to support any one of the projected mortgage bailout schemes currently proposed or being considered by Congress. The present invention may be used for housing finance as an alternative to bank lending and securitization since the present invention achieves a similar result in a highly efficient manner and allows non-banking entities to fund residential real estate by purchasing Home Certificates which are transferable including through in a secondary market. In an alternative embodiment, the present invention can be used similar to the way loans were sliced up and sold to different investors by merely aggregating Home Certificates to fund one Time-Out Mortgage Loan. Also, while it is anticipated that any existing government or private guarantee on prior home loans may be transferred to the Home Certificate, that the obligation would be reduced through successful implementation of the Program Insurance Fund. The implementing organization will determine whether such pre-existing insurance will be layered above or below the insurance provided by the Program Insurance Fund. Despite the obvious advantages of creation of such a guarantee insurance fund, in an alternative embodiment of the present invention, the system may function without such insurance. However, it is likely that without such a fund supporting, the Home Certificate programs, market forces and simple economics will dictate that the monthly costs for homeowners to participate in the program and remain in their homes may be driven to substantially higher levels, likely to be unaffordable to the Homeowner.

In the event a Homeowner defaults on a Time-Out Mortgage Loan or discloses to the Program Administrator that the Homeowner is having difficulty affording the monthly payment on the Time-Out Mortgage Loan, there are many options that can be utilized to avoid a default in the Home Certificate. In a preferred embodiment, the Home Certificate that, at that time, supports the particular Time-Out Mortgage Loan may be replaced by another Home Certificate obtained through the Program's auction, as described above, or, in an alternative embodiment, sold through other methods, except this Home Certificate may be for a shorter term (during a period where the interest rate curve is normal or for a longer term during a period where interest rate curve is inverted) thereby accessing lower interest rates. Also, during any period in which the interest rate curve becomes inverted, shorter term Home Certificates could be replaced by longer term Home Certificates while lowering a Home Certificate's interest rate resulting in a lower homeowner's monthly payment. The proceeds of the new Home Certificate would be used to pay-off the original Home Certificate. In this manner, the "default" or imminent default on the Time-Out Mortgage would be insulated from the Investor. This process can be used continually to reduce the Homeowner's monthly payment to an affordable amount without resulting in any loss to the Program's insurance fund or to any Investor. In another embodiment, the Program Administrator or the Program's Insurance Fund could take title to the underlying home through a simplified administrative foreclosure procedure as spelled out in the controlling Time-Out Mortgage Loan and Time-Out Mortgage agreements executed by Homeowner. The Homeowner could be asked to pay a periodic tenancy fee which could be greater than, less than, or equal to the interest payments to the Investor on the Home Certificate that is associated with the underlying home. If the periodic tenancy fee is less than monthly Home Certificate monthly payments, the Program's insurance would be subsidizing the former Homeowner's ability to remain in the home. Any such subsidy could be reimbursed from the Program's zero-subsidy insurance fund. This would likely be less costly than allowing the Home Certificate to be defaulted resulting in an insurance claim on the insurance fund at the full principal value of the Home Certificate plus any accrued but unpaid interest. If the Investor decides to receive insurance payment from the Program Insurance Fund, and forego the periodic tenancy lease option with the defaulting homeowner, then the Program Insurance Fund can liquidate the property or use the property for another purpose, such as a Section 8-type program.

In another embodiment, it may be possible for a single homeowner to have multiple Home Certificates against his/her home. In this case, the multiple Home Certificates owned by the one owner may be aggregated into a Master Home Certificate. This flexibility in the Home Certificate will facilitate trading of Home Certificates on a greater scale to a secondary market.

Figure 2A:
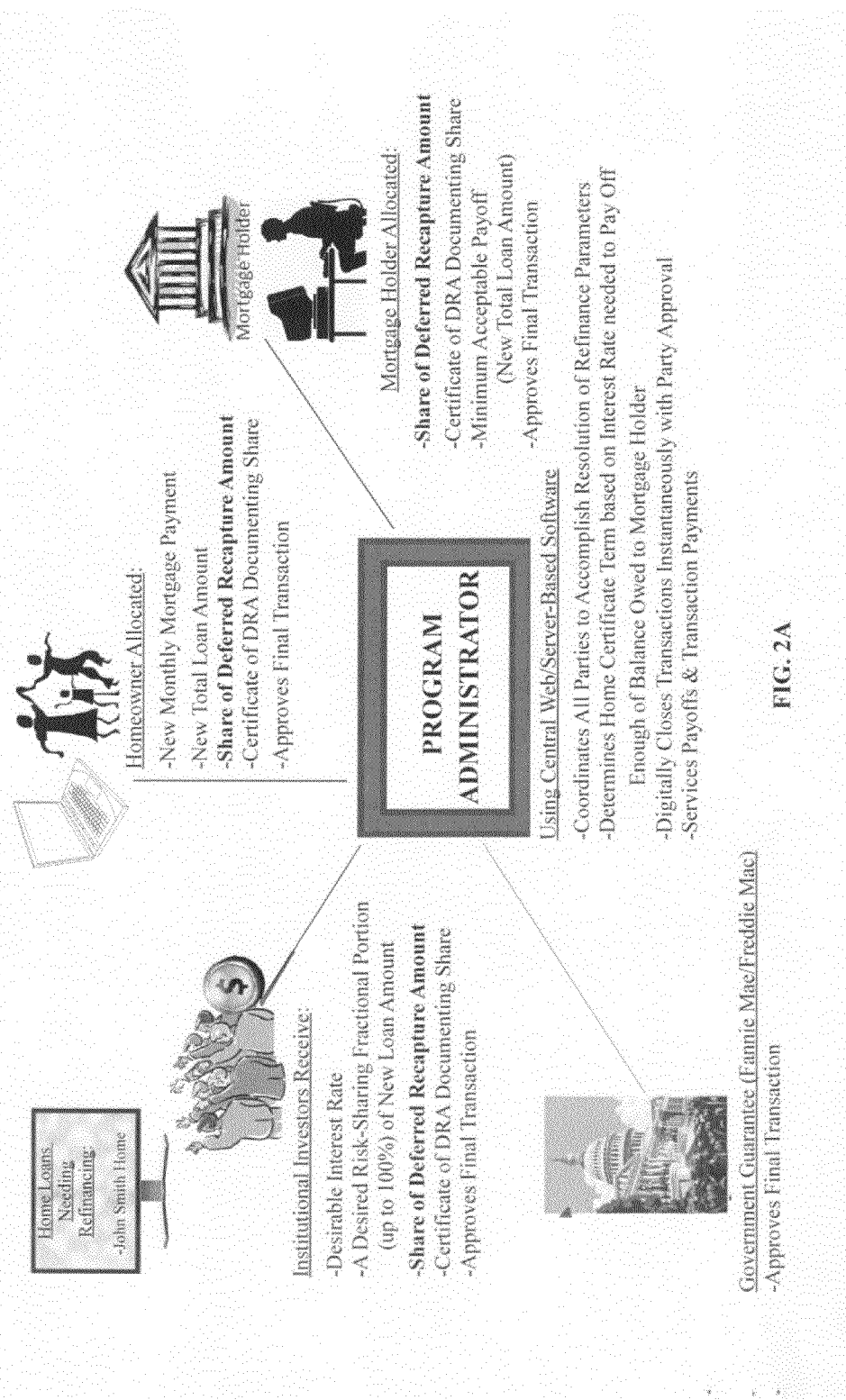
FIG. 2A is a graphical illustration showing an alternate embodiment of the current invention, where the auction is replaced by a Program Administrator mediating terms of the refinance agreement.

In a different embodiment of the current invention, the auction may be replaced by a Program Administrator, as seen in FIG. 2A, who may serve in mediating ("distributing") terms for the new financing arrangement in a method similar to one that the Arizona Housing Finance Authority is already regularly using for the sale of Municipal Bonds. The Program Administrator may use software to determine a term for the Home Certificate, based upon the interest rate needed in order to deliver a calculated Home Certificate principal amount to pay-off enough of the balance of the existing (old) loan so that the arrangement is acceptable to the Mortgage Holder/Servicer/Guarantor/Insurer. Depending upon interest rates available during implementation of the Program, Home Certificate terms may be, for example, 10 years, 7 years, or 5 years. Shorter term Home Certificates (probably 3 years and less) may be available for more difficult situations where the homeowner's finances are questionable, so that the monthly mortgage payment may be kept to a minimum. The shorter the term of the Home Certificate, the more the exposure by the homeowner to interest rate risk. As an alternative method for selling Home Certificates, they may be sold with either a stated (fixed) interest rate for the applicable term or a broker/dealer may be allowed to use a treasury bill-like auction to set the interest rates based upon demand for the Home Certificates at the time they are sold, where there may be several rate and term pairs offered per a prospectus. (Note—It may be necessary for a Guarantor/Insurer such as Freddie, Fannie, or FHA to "approve" the transaction after it is approved by the Mortgage Holder/Servicer—alternatively, there may be no need for the Mortgage Holder/Servicer to approve if the Guarantor/Insurer approves if there is a guarantee/insurance claim.)

To properly enable the software utilized by the present invention, which may run on a computer and/or server, or be accessed therefrom, a description of such a computer system is hereinafter disclosed. An exemplary computer system 200, through which the user may utilize the software disclosed herein, is shown schematically in FIG. 10, and which may comprise a computing unit 201 interacting with external peripherals 202, such as a separate touch screen display 244, and interacting with network resources 203, including use of the interne 261, and other computers, which may be a laptop computer 262, a second computer 263, etc. A complete exemplary computer system will be described for an understanding of how the disclosed software may interact with, and on, computing unit 201, even though an embodiment involving usage of the software may not require each of the described computer components.

The computing unit 201 may include a data bus 224 or other communication mechanism for communicating information across and among various parts of computing unit 201, and a central processing unit ("processor" or CPU) 222 coupled with a bus 224 for processing information and performing other computational and control tasks. Computing unit 201 may also include a volatile storage 225, such as a random access memory (RAM) or other dynamic storage device, coupled to bus 224 for storing various information as well as instructions to be executed by processor 222. The RAM may be Dynamic Random Access Memory (DRAM), or Static RAM (SRAM), or any other similar type of RAM known in the art. The volatile storage 225 also may be used for storing temporary variables or other intermediate information during execution of instructions by processor 222. Computing unit 201 may further include a read only memory (ROM) or an erasable programmable memory (EPROM) 227 or other static storage device coupled to bus 224 for storing static information and instructions for processor 222, such as basic input-output system (BIOS), as well as various system configuration parameters. A persistent storage device or non-volatile memory 226, such as a magnetic disk, optical disk, or solid-state flash memory device may be provided and may be coupled to bus 224 for storing information and instructions.

Computing unit 201 may be coupled via bus 224 to an integral touch screen display 221, such as a plasma display, or a liquid crystal display (LCD), for displaying information to a user of the computing unit 201. If desired, the computing unit 201 may also be coupled via bus 224 to an external display screen 244, which may further comprise a cathode ray tube (CRT). An external input device 243, including alphanumeric and other keys, may also be coupled to bus 224 for communicating information and command selections to processor 222. Another type of user input device is cursor control device 242, such as a mouse, a trackball, or cursor direction keys for communicating direction information and command selections to processor 222 and for controlling cursor movement on display 244, if desired. Also, a cursor control device 242 may also be utilized for the computers 262-264 of the network resources 203.

An external storage device 241 may be connected to the computing unit 201 via bus 224 to provide an extra or removable storage capacity for the computing unit 201. In an embodiment of the computer system 200, the external removable storage device 242 may be used to facilitate exchange of data with other computer systems.

According to one embodiment of the invention, the techniques described herein are performed by computing unit 201 in response to processor 222 executing one or more sequences of one or more instructions contained in the volatile memory 225. Such instructions may be read into volatile memory 225 from another computer-readable medium, such as persistent storage device or non-volatile memory device 226. Execution of the sequences of instructions contained in the volatile memory 225 causes processor 222 to perform the process steps described herein. In alternative embodiments, hard-wired circuitry may be used in place of, or in combination with, software instructions to implement the invention. Thus, embodiments of the invention are not limited to any specific combination of hardware circuitry and software.

The term "computer-readable medium" as used herein refers to any medium that participates in providing instructions to processor 222 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 226. Volatile media includes dynamic memory, such as volatile storage 225. Transmission media includes coaxial cables, copper wire and fiber optics, including the wires that comprise data bus 224. Transmission media can also take the form of acoustic or light waves, such as those generated during radio-wave and infra-red data communications.

Common forms of computer-readable media include, for example, a floppy disk, a flexible disk, a hard disk, magnetic tape, or any other magnetic medium, a CD-ROM, any other optical medium, punchcards, papertape, a RAM, a PROM, an EPROM, a FLASH-EPROM, a flash drive, a memory card, and a carrier wave as described hereinafter, or any other medium from which a computer can read.

Various forms of computer readable media may be involved in carrying one or more sequences of one or more instructions to processor 222 for execution. For example, the instructions may initially be carried on a magnetic disk from a remote computer. Alternatively, a remote computer can load the instructions into its dynamic memory and send the instructions over a telephone line using a modem. A modem local to computer system 200 can receive the data on the telephone line. The bus 222 may carry the data to the volatile storage 225, from which processor 222 retrieves and executes the instructions. The instructions received by the volatile memory 225 may optionally be stored on persistent storage device 226 either before or after execution by processor 222. The instructions may also be downloaded into the computing unit 201 via the internet 261.

The computing unit 201 may also include a communication interface, such as network interface card 223 coupled to the data bus 222. Communication interface 223 may provide a two-way data communication coupling to a network link that may be connected to a local network. For example, communication interface 223 may be an integrated services digital network (ISDN) card or a modem to provide a data communication connection to a corresponding type of telephone line. As another example, communication interface 223 may be a local area network interface card (LAN NIC) to provide a data communication connection to a compatible LAN. In any such implementation, communication interface 223 sends and receives electrical, electromagnetic or optical signals that carry digital data streams representing various types of information.

Network link 223 typically provides data communication to other network resources. For example, the network link may provide a connection over the internet 261 to the wide-wide-web. Thus, the computing unit 201 can access resources located anywhere using the Internet 261. On the other hand, the computing unit 201 may also be accessed by others, such as computers 262-264 with permission, which may be located anywhere with access to the internet 261.

The Internet 261 uses electrical, electromagnetic or optical signals that carry digital data streams. The signals through the various networks and the signals on network link and through communication interface, which carry the digital data to and from computing unit 201, are exemplary forms of carrier waves transporting the information.

Computing unit 201 may be able to send messages and receive data, including program code, through the variety of network(s) including the Internet 261, network link and communication interface 223. In the Internet example, when the computing unit 201 acts as a network server, it might transmit a requested code or data for an application program running on computers 262-264 through the Internet 261. Similarly, it may receive code from other network resources. The received code may be executed by processor 222 as it is received, and/or stored in persistent or volatile storage devices 226 and 225, respectively, or other non-volatile storage for later execution. In this manner, computer system 200 may obtain application code in the form of a carrier wave.

What is claimed is:

1. A process of coordinating and contractually binding one or more homeowners, one or more respective mortgage holders, and one or more investors, for financing of a home with an underwater mortgage using a computer system, said process comprising the following steps:
using one or more processors to execute instructions retained in machine-readable media to cause the computer system to display a website usable for a financing auction of said process;
searching, by the respective mortgage holders, over the internet for an auction website of said process;
registering, by at least one of the one or more respective mortgage holders and the one or more homeowners, in said auction website, by entering data therein;
scheduling said financing auction, said financing auction occurring on a bidding platform of said auction website;
providing the one or more investors, the one or more respective mortgage holders and the one or more homeowners with access to said bidding platform for said scheduled financing auction; conducting said financing auction on said bidding platform, said financing auction comprising:
matching of an interest rate bid by the one or more investors with a monthly payment bid by the one or more homeowners, resulting in a calculated principal loan amount for a time-out mortgage loan; bidding, by the one or more homeowners, the one or more respective mortgage holders, and the one or more investors, for a fractional portion of a deferred recapture amount (DRA), said DRA comprising a difference between the total amount of all of the loan agreements held by the one or more respective mortgage holders and the amount of said time out mortgage loan; and accepting, by the one or more homeowners, the one or more respective mortgage holders, and the one or more investors, to said matched interest rate bid and corresponding monthly payment bid;

agreeing, by the one or more homeowners, the one or more respective mortgage holders, and the one or more investors-to a term for said time-out mortgage loan; and to a post-auction varying scheme for said fractional portions of said DRA; said post-auction varying scheme for said fractional portions of said DRA comprising a buy-in method, wherein each dollar amount of monthly payment, as a percentage, remitted by the one or more homeowners above a payment required by said time-out mortgage, thereby entitling the one or more homeowners to keep an additional percentage of said DRA; and closing by said auction website resulting in: mutual rescinding of all of the loan agreements held by the one or more respective mortgage holders; issuing of said time-out mortgage loan, and a time-out mortgage against the home, and issuing of a home certificate, said home certificate evidencing an amount of investment by each of the one or more investors.

2. The process according to claim 1, said auction comprising:
an amount of sharing bid resolution algorithm; and, wherein when said bidding by the one or more homeowners, the respective mortgage holders, and the one or more investors for said fractional amount of said DRA totals to be less than a threshold amount above 100%, said bid resolution algorithm operating to modify each of said bid fractional portions to total to 100%.

3. The process according to claim 2 wherein said bid modification by said bid resolution algorithm comprises:
reducing each bid in proportion to said total amount bid.

4. The process according to claim 1, further comprising searching, by the one or more homeowners, over the internet for an auction website of said process.

5. The process according to claim 4, further comprising communicating, by said auction website, to the one or more respective mortgage holders, the one or more investors and the one or more homeowners, of an invitation comprising particular web-site access for said financing auction on said bidding platform.

* * * * *